(12) United States Patent
Liu et al.

(10) Patent No.: US 12,198,139 B2
(45) Date of Patent: Jan. 14, 2025

(54) BLOCKCHAIN ADDRESS RISK ASSESSMENT VIA GRAPH ANALYSIS

(71) Applicant: PayPal, Inc., San Jose, CA (US)

(72) Inventors: Lichao Liu, Sunnyvale, CA (US); Michael Jim Tien Chan, Cupertino, CA (US)

(73) Assignee: PayPal, Inc., San Jose, CA (US)

( * ) Notice: Subject to any disclaimer, the term of this patent is extended or adjusted under 35 U.S.C. 154(b) by 733 days.

(21) Appl. No.: 17/361,400

(22) Filed: Jun. 29, 2021

(65) Prior Publication Data

US 2022/0414664 A1 Dec. 29, 2022

(51) Int. Cl.
| | | |
|---|---|---|
| G06Q 20/40 | (2012.01) | |
| G06N 20/00 | (2019.01) | |
| G06Q 20/06 | (2012.01) | |
| G06Q 20/38 | (2012.01) | |
| H04L 9/32 | (2006.01) | |
| H04L 9/00 | (2022.01) | |

(52) U.S. Cl.
CPC ......... *G06Q 20/4016* (2013.01); *G06N 20/00* (2019.01); *G06Q 20/065* (2013.01); *G06Q 20/38215* (2013.01); *H04L 9/3247* (2013.01); *H04L 9/50* (2022.05); *H04L 2209/56* (2013.01)

(58) Field of Classification Search
CPC .............. G06Q 20/4016; G06Q 20/065; G06Q 20/38215; G06Q 20/02; G06N 20/00; H04L 9/3247; H04L 9/50; H04L 2209/56
See application file for complete search history.

(56) References Cited

U.S. PATENT DOCUMENTS

| | | | | |
|---|---|---|---|---|
| 10,839,320 | B2* | 11/2020 | Augustine | ............... H04L 63/12 |
| 2019/0288850 | A1* | 9/2019 | Beecham | ............ G06F 21/6209 |
| 2019/0340379 | A1* | 11/2019 | Beecham | ............ G06F 16/9014 |
| 2020/0394709 | A1* | 12/2020 | Cella | ..................... G06N 3/042 |

(Continued)

OTHER PUBLICATIONS

Agrawal, de Alfaro, Polychronopoulos, Learning From Graph Neighborhoods Using LSTMs, 2016, arXiv:1611.06882v1 (Year: 2016).*

(Continued)

*Primary Examiner* — Patrick McAtee
*Assistant Examiner* — Nakia Leffall-Allen
(74) *Attorney, Agent, or Firm* — Greenberg Traurig, LLP

(57) ABSTRACT

Novel technical ways of analyzing a blockchain system using machine learning are presented, including structures and techniques that can facilitate blockchain address risk assessment via graph analysis. In various embodiments, a system can access a blockchain. The system can build a transaction graph based on analysis of the blockchain. Nodes of the transaction graph can respectively represent blockchain addresses that are recorded in the blockchain. In various cases, edges in the transaction graph can respectively represent blockchain transactions between different ones of the blockchain addresses that are recorded in the blockchain. The system can calculate risk scores respectively corresponding to the blockchain addresses, based on analyzing the transaction graph via at least one machine learning algorithm. These techniques can improve computer operational efficiency by avoiding the execution of unnecessary blockchain transactions.

20 Claims, 23 Drawing Sheets

(56) References Cited

U.S. PATENT DOCUMENTS

2021/0073287 A1* 3/2021 Hunter ................. H04L 63/123
2021/0073291 A1* 3/2021 Hunter ..................... G06F 8/33

OTHER PUBLICATIONS

Learning From Graph Neighborhoods Using LSTMs (Year: 2016).*
Elliptic | https://www.elliptic.co/, webpage, last accessed on Apr. 14, 2021.
Ciphertrace | https://ciphertrace.com/, webpage, last accessed on Apr. 14, 2021.
Chainanalysis | https://www.chainalysis.com/, webpage, last accessed on Apr. 14, 2021.
Wikipedia | Strongly Connected Component. https://en.wikipedia.org/wiki/Strongly_connected_component, last accessed on May 19, 2021, 4 pages.
Wikipedia | HITS algorithm, https://en.wikipedia.org/wiki/HITS_algorithm, last accessed on May 19, 2021, 5 pages.

* cited by examiner

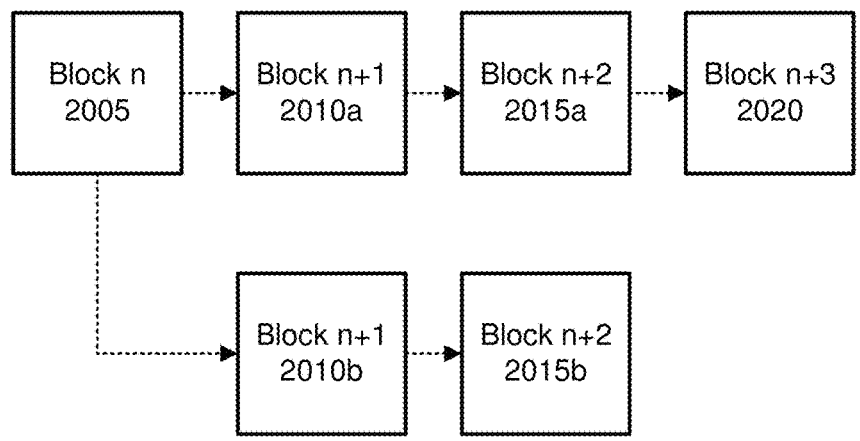
FIG. 20A
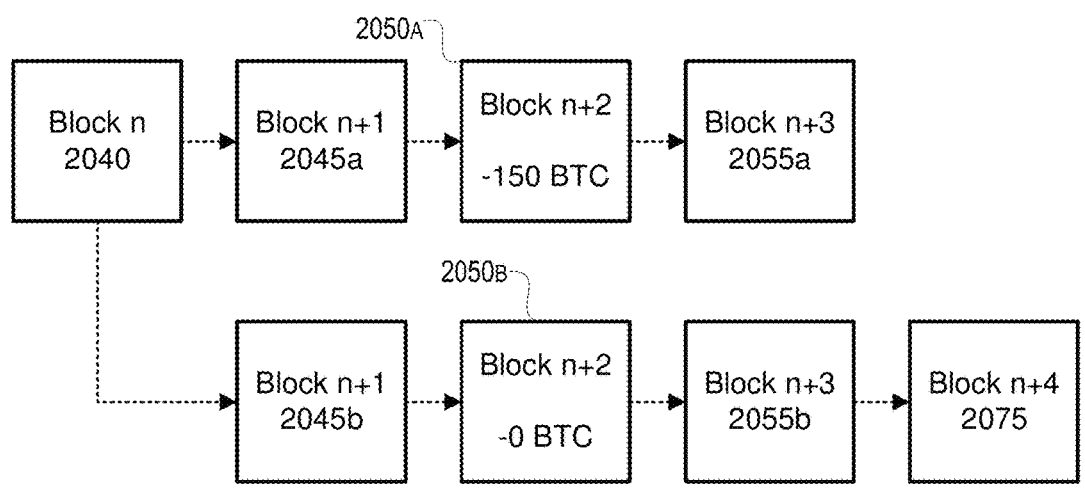
FIG. 20B
FIGs. 20A-20B

BLOCKCHAIN ADDRESS RISK ASSESSMENT VIA GRAPH ANALYSIS

TECHNICAL FIELD

The subject disclosure relates generally to blockchains, and more specifically to blockchain address risk assessment via graph analysis, according to various embodiments.

BACKGROUND

Electronic transactions with cryptocurrencies are digitally recorded via blockchains. A blockchain can be a decentralized list of electronic blocks, where each electronic block contains a timestamp of one or more transactions, metadata characterizing the one or more transactions, and/or a cryptographic hash of the previous electronic block. Given the increasing prevalence of electronic transactions involving cryptocurrencies, Applicant recognizes there exists a need for systems and/or techniques that can electronically analyze a blockchain in order to estimate levels of risk associated with such transactions and/or to otherwise detect fraud and to provide enhanced computer security for users.

Systems and/or techniques that can ameliorate one or more of these issues are desirable.

BRIEF DESCRIPTION OF THE DRAWINGS

FIG. 20A shows an example of a privately broadcasted blockchain.

FIG. 20B shows an example of blockchain misuse.

DETAILED DESCRIPTION

Figure 1:
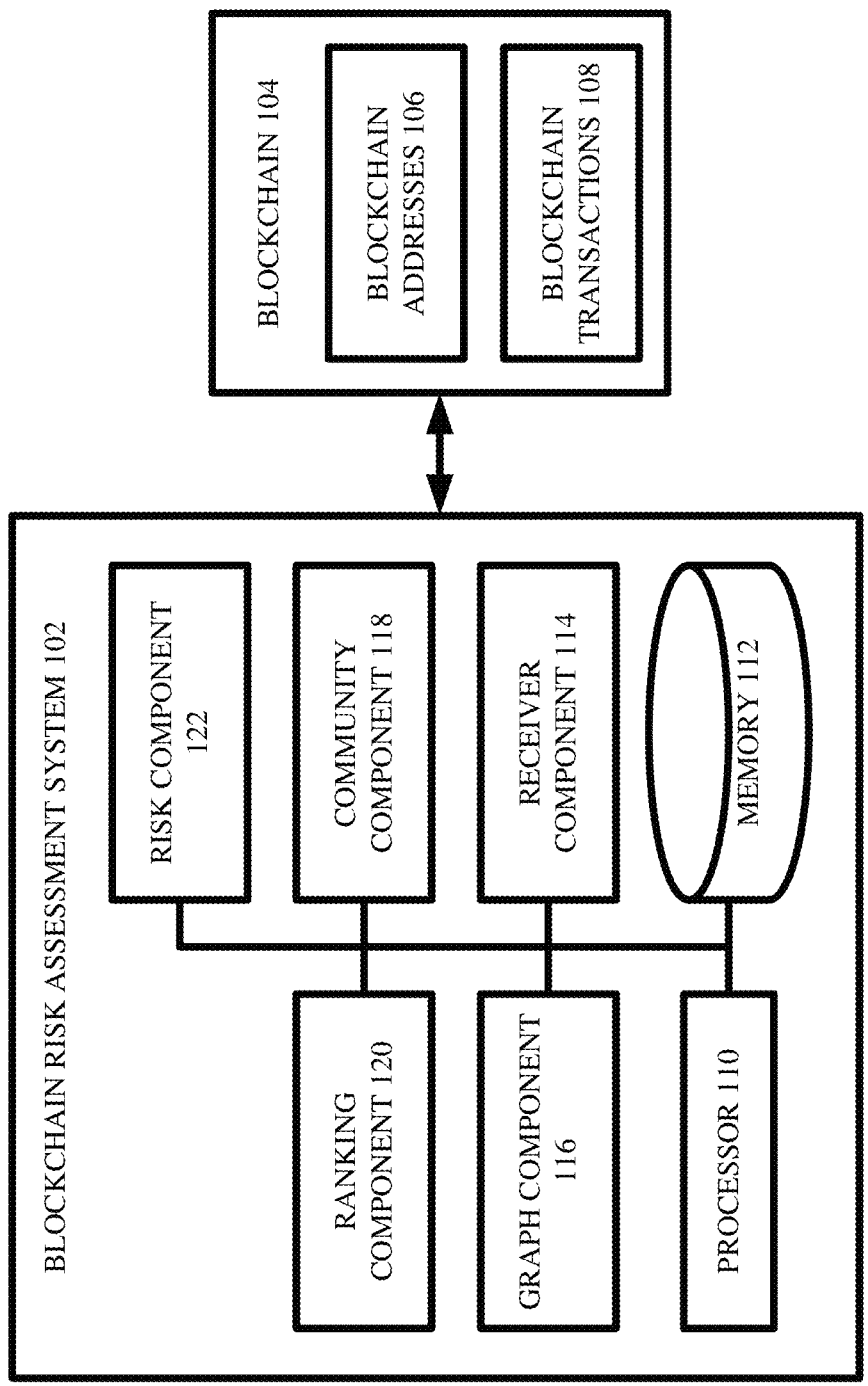
FIG. 1 illustrates a high-level block diagram of an example, non-limiting system that facilitates blockchain address risk assessment via graph analysis in accordance with one or more embodiments described herein.

The following detailed description is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Electronic transactions involving cryptocurrencies (e.g., Bitcoin®, Ethereum®, Litecoin®, Dogecoin®, Bitcoin Cash®) can be digitally recorded via blockchains. A blockchain can be a decentralized list of electronic blocks, where each electronic block contains a timestamp of one or more transactions (e.g., the time at and/or about which such one or more transactions occurred), metadata characterizing the one or more transactions (e.g., amounts of cryptocurrencies involved in such one or more transactions, blockchain addresses from which and/or to which such amounts of cryptocurrencies were transferred during such one or more transactions), and/or a cryptographic hash of the previous electronic block. Because each electronic block can include a cryptographic hash of the previous electronic block, the blockchain can be resistant to retroactive tampering, which has led to a surge in the popularity of blockchain technology and a commensurate surge in the popularity of cryptocurrencies. Given the increasing prevalence of electronic transactions involving cryptocurrencies (e.g., more vendors are willing to accept cryptocurrencies as payment), there exists a need for systems and/or techniques that can electronically analyze a blockchain in order to estimate levels of risk associated with different blockchain addresses recorded in the blockchain, so as to help to ferret out fraud.

Various embodiments of the subject innovation can address one or more of these technical problems. One or more embodiments described herein can include systems, computer-implemented methods, apparatus, and/or computer program products that can facilitate blockchain address risk assessment via graph analysis. In other words, various embodiments described herein can include a computerized tool (e.g., any suitable combination of computer-executable hardware and/or computer-executable software) that can electronically receive as input a blockchain and that can electronically produce as output risk scores that indicate levels of risk associated with blockchain addresses that are recorded in the blockchain.

More specifically, the computerized tool can electronically construct a transaction graph (e.g., a data structure having nodes and/or edges) based on the blockchain. In various aspects, nodes of the transaction graph can correspond to blockchain addresses that are recorded and/or otherwise indicated in the blockchain. In various instances, edges of the transaction graph can correspond to blockchain transactions that have occurred between various pairs of the blockchain addresses, as recorded and/or otherwise indicated in the blockchain.

In various aspects, the computerized tool can generate the risk scores based on executing any suitable machine learning algorithms on the transaction graph. For instance, the computerized tool can, in some cases, execute a community detection algorithm on the transaction graph, which can result in the identification of a set of transaction communities in the transaction graph (e.g., a transaction community can include nodes that are not coupled via edges to any node that is outside of the transaction community). Furthermore, in various aspects, the computerized tool can execute an importance-assignment algorithm on each of the set of transaction communities, thereby assigning to each node a corresponding level of importance (e.g., a node's level of importance can be based on the nodes and/or edges that are within its transaction community). In various instances, the computerized tool can compute a risk score for each node, based on the node's level of importance and based on at least one other variable (e.g., the number of nodes in the transaction community, the number of edges coupled to the node).

In various cases, such risk scores can be leveraged to decide whether to engage in future blockchain transactions with various blockchain addresses. For instance, when given an opportunity to engage in a future blockchain transaction with a blockchain address that has a high risk score (e.g., a risk score above any suitable threshold), the opportunity can be declined (e.g., the high risk score can indicate that the past behavior of the blockchain address, as recorded in the blockchain, is questionable and/or otherwise concerning). In contrast, when given an opportunity to engage in a future blockchain transaction with a blockchain address that has a low risk score (e.g., a risk score below any suitable threshold), the opportunity can be accepted (e.g., the low risk score can indicate that the past behavior of the blockchain address, as recorded in the blockchain, is not questionable and/or otherwise concerning).

In various embodiments, a computerized tool as described herein can comprise a receiver component, a graph component, a community component, a ranking component, and/or a risk component.

In various embodiments, the receiver component of the computerized tool can electronically receive and/or retrieve a blockchain from any suitable database and/or computing device that is electronically accessible to the receiver component, whether such database and/or computing device is remote from and/or local to the receiver component. In other words, the receiver component can electronically access the blockchain, such that other components of the computerized tool can read, parse, and/or otherwise interact with the blockchain.

In various cases, the blockchain can include any suitable number of blocks, which can collectively indicate any suitable number of blockchain transactions that have occurred between any suitable number of blockchain addresses over any suitable period of time. In various aspects, for any given blockchain transaction that is recorded in the blockchain, the blockchain can indicate an approximate and/or exact time and/or date at which the given blockchain transaction occurred, can indicate an amount and/or type of cryptocurrency that was transferred during the given blockchain transaction, can indicate a blockchain address which transferred and/or paid the indicated amount and/or type of cryptocurrency, and/or can indicate a blockchain address which received and/or was paid the indicated amount and/or type of cryptocurrency.

In various embodiments, the graph component of the computerized tool can electronically generate a transaction graph based on the blockchain. More specifically, the graph component can electronically read and/or parse the blockchain in any suitable fashion and/or via any suitable technique. Such reading and/or parsing can cause the graph component to identify which blockchain transactions occurred between which blockchain addresses at which times. Accordingly, the graph component can electronically initialize an empty graph structure, can electronically insert into the graph structure one node for each unique blockchain address that is identified, and can electronically insert into the graph structure one edge between a pair of nodes for each unique blockchain transaction that is identified. In some cases, the edges of the graph structure can be directed, so as to indicate directions in which cryptocurrency was transferred. In various aspects, the edges of the graph structure can be weighted, so as to indicate amounts of cryptocurrency that was transferred. In various instances, the edges of the graph structure can be tagged with any other suitable information as desired (e.g., time of transaction, type of cryptocurrency involved in transaction). In various cases, this graph structure can be considered as the transaction graph.

For instance, for any given blockchain transaction that is recorded in the blockchain, the blockchain can specify a transferor blockchain address (e.g., a blockchain address that transferred and/or paid cryptocurrency during the blockchain transaction), a transferee blockchain address (e.g., a blockchain address that received and/or was paid cryptocurrency during the blockchain transaction), and/or an amount of cryptocurrency that was transferred during the blockchain transaction. Accordingly, by reading and/or parsing the blockchain, the graph component can identify the transferor blockchain address involved in the given blockchain transaction, the transferee blockchain address involved in the given blockchain transaction, and/or the amount of cryptocurrency transferred during the given blockchain transaction. Thus, the graph component can insert into the transaction graph a first node representing the transferor blockchain address, if such first node has not already been inserted into the transaction graph (e.g., even though this particular blockchain address may have participated in multiple blockchain transactions as either the transferor and/or the transferee, this particular blockchain address can be represented by a single node so as to avoid duplicate nodes in the transaction graph). Similarly, the graph component can insert into the transaction graph a second node representing the transferee blockchain address, if such second node has not already been inserted into the transaction graph. Moreover, the graph component can insert into the transaction graph an edge between the first node and the second node, thereby representing the given blockchain transaction. In various cases, the edge can point away from the first node and toward the second node, thereby indicating that cryptocurrency was transferred from the first node (e.g., the transferor blockchain address) to the second node (e.g., the transferee blockchain address) during the given blockchain transaction. In various aspects, the edge can be weighted, thereby representing the amount of cryptocurrency that was transferred from the first node (e.g., the transferor blockchain address) to the second node (e.g., the transferee blockchain address) during the given blockchain transaction. In some cases, the edge can be tagged with a cryptocurrency identifier, thereby representing the type and/or name of the cryptocurrency that was transferred during the given blockchain transaction. The graph component can, in various aspects, repeat this procedure for all blockchain transactions that are recorded in the blockchain. Once all unique blockchain addresses and/or all unique blockchain transactions that are recorded in the blockchain are represented in the transaction graph (e.g., by nodes and/or weighted/directed edges, respectively), the transaction graph can be considered as representing the blockchain.

In various embodiments, the community component of the computerized tool can electronically execute a community detection algorithm on the transaction graph. In various cases, the community detection algorithm can be any suitable algorithm, whether or not machine learning, that is configured to identify communities of nodes within the transaction graph. Such communities of nodes can, in various instances, be referred to as transaction communities. In various cases, such transaction communities can be non-overlapping. That is, in various aspects, no two transaction communities can share one or more nodes with each other (e.g., no node can be a member of more than one transaction community). In various instances, such transaction communities can be isolated from each other. For instance, a node within any given transaction community can be not coupled by an edge to any node that is outside of the given transaction community. In various other cases, however, such transaction communities can be weakly coupled together. For instance, a node within any given transaction community can, in some cases, be coupled to nodes outside of the given transaction community only by edges that have weights that are below any suitable threshold. Non-limiting examples of the community detection algorithm can include depth-first-search-based algorithms (e.g., Kosaraju's algorithm, Tarjan's algorithm, path-based strong component algorithm), reachability algorithms, the Louvain community detection algorithm, the Surprise community detection algorithm, the Leiden community detection algorithm, the Walktrap community detection algorithm, and/or any other suitable algorithms.

In various embodiments, the ranking component of the computerized tool can electronically execute an importance-assignment algorithm on each of the transaction communities. In various aspects, the importance-assignment algorithm can be any suitable algorithm, whether or not machine learning, that is configured to assign levels of importance to each node within any given transaction community, based on the edges that are coupled to the node and/or based on other nodes that are within the given transaction community. As a non-limiting example, the importance-assignment algorithm can be the PageRank® algorithm. In various cases, the PageRank algorithm can estimate how important a node is by counting the number and/or weights of edges that are coupled to the node and/or by taking into account the estimated importance of other nodes that are coupled to the node. Accordingly, a particular node's level of importance can increase as the number of edges that are coupled to the particular node increases, can increase as the weights of the edges that are coupled to the particular node increases, and/or can increase as the levels of importance of other nodes that are coupled by edges to the particular node increase. In contrast, a particular node's level of importance can decrease as the number of edges that are coupled to the particular node decrease, can decrease as the weights of the edges that are coupled to the particular node decrease, and/or can decrease as the levels of importance of other nodes that are coupled by edges to the particular node decrease. If the PageRank algorithm is implemented by the ranking component, the resulting levels of importance can be referred to as "pagerank measures" (e.g., the level of importance of a node can be called the pagerank measure of the node). In various instances, another non-limiting example of the importance assignment algorithm can be the Hyperlink-Induced Topic Search (HITS) algorithm. In various aspects, the importance-assignment algorithm can be any other suitable link analysis algorithm that can be configured to receive as input a transaction community and to estimate as output levels of importance of nodes within the transaction community. In any case, the ranking component can assign to each node of each transaction community, and thus to each node of the transaction graph, a level of importance.

In various embodiments, the risk component of the computerized tool can electronically compute a risk score for each of the nodes in the transaction graph (and thus for each blockchain address recorded in the blockchain), based at least on the level of importance of each node. In various aspects, the risk component can utilize a risk formula that takes as an argument the level of importance of a node and that outputs a risk score corresponding to the node. In various instances, to supplement the level of importance of the node, the risk formula can take as an argument any other suitable information pertaining to the node. For example, in some cases, the risk formula can take as an argument the number of edges that are coupled to the node (e.g., blockchain addresses that have been involved in many blockchain transactions can be considered as less suspect and/or more trustworthy than blockchain addresses that have been involved in few transactions). As another example, the risk formula can take as an argument the size of the transaction community in which the node is located (e.g., a transaction community that includes many nodes, and thus many blockchain addresses, can be considered as less suspect and/or more trustworthy than a transaction community that includes few nodes, and thus few blockchain addresses). As still another example, the risk formula can take as an argument a bit that represents whether or not the node is the most important node within its transaction community (e.g., a bit value of 1 can indicate that the node has the highest level of importance in its transaction community, while a bit value of 0 can indicate that the node does not have the highest level of importance in its transaction community). As yet another example, the risk formula can take as an argument an amount of time that has elapsed since creation of the blockchain address that is represented by the node (e.g., older, more established blockchain addresses can be considered as less suspect and/or more trustworthy than younger, less established blockchain addresses). As a further example, the risk formula can take as an argument a number of smart contract tokens that are associated with the blockchain address represented by the node (e.g., a blockchain address that has obtained many smart contract tokens can be considered as less suspect and/or more trustworthy than a blockchain address that has obtained few tokens). In various aspects, the risk formula can include configurable parameters that can be used to respectively weight the level of importance and/or any of the above-mentioned other arguments. In some instances, the risk formula can include computing a weighted linear combination of the level of importance and/or any of the above-mentioned other arguments based on the configurable parameters. In various cases, the risk formula can include computing a reciprocal exponential of the weighted linear combination, and such reciprocal exponential can be considered as the risk score for the node. In various aspects, the risk component can apply the risk formula to each node in the transaction graph, thereby resulting in a risk score for each node and thus a risk score for each blockchain address.

In various embodiments, the risk component can electronically transmit the risk scores to any suitable database and/or computing device, as desired. In some cases, the risk component can electronically create a risk report that lists and/or summarizes such risk scores, and/or that otherwise ranks the blockchain addresses according to their assigned risk scores. For instance, the risk report can identify and/or highlight a blockchain address that has a highest risk score, and/or can identify and/or highlight a blockchain address that has a lowest risk score.

To help clarify some of the above discussion, consider the following non-limiting example. It is to be understood that any numbers specified in this non-limiting example are for purposes of illustration and are non-limiting.

Suppose that the blockchain lists three blockchain transactions: a first blockchain transaction in which a blockchain address A transferred x Bitcoins to a blockchain address B, for any suitable positive real number x; a second blockchain transaction in which a blockchain address C transferred y Bitcoins to the blockchain address B, for any suitable positive real number y; and a third blockchain transaction in which a blockchain address D transferred z Bitcoins to a blockchain address E, for any suitable positive real number z. In other words, the blockchain can indicate three blockchain transactions that have occurred among and/or between five blockchain addresses A-E.

In various aspects, the receiver component of the computerized tool can electronically receive, retrieve, and/or otherwise access the blockchain.

In various instances, the graph component can electronically build a transaction graph based on the blockchain. Specifically, the graph component can read and/or parse the blockchain, thereby identifying the three blockchain transactions and the five blockchain addresses A-E. In various aspects, the graph component can initialize the transaction graph as an empty graph structure, and the graph component can insert five nodes and three edges into the transaction graph, that respectively correspond to the five blockchain addresses A-E and the three blockchain transactions.

For instance, the graph component can begin with the first blockchain transaction. Since the graph component can read and/or parse the blockchain, the graph component can discover that, during the first blockchain transaction, the blockchain address A transferred x Bitcoins to the blockchain address B. Accordingly, the graph component can insert into the transaction graph a node that corresponds to and/or otherwise represents the blockchain address A (e.g., this node can be tagged with an identifier indicating the blockchain address A). For ease of explanation, this node can be referred to as node A. Moreover, the graph component can insert into the transaction graph another node that corresponds to and/or otherwise represents the blockchain address B. For ease of explanation, this another node can be referred to as node B. Furthermore, the graph component can insert into the transaction graph an edge between the node A and the node B. In various aspects, this edge can be directed, such that it points away from the node A and toward the node B. In various instances, a weight of this edge can be equal to and/or otherwise based on x. Accordingly, the result can be that the transaction graph includes an edge of weight x that points from the node A to the node B, which can collectively represent that the blockchain address A transferred x Bitcoins to the blockchain address B.

In various cases, the graph component can move on to the second blockchain transaction. Since the graph component can read and/or parse the blockchain, the graph component can discover that, during the second blockchain transaction, the blockchain address C transferred y Bitcoins to the blockchain address B. Accordingly, the graph component can insert into the transaction graph a node that corresponds to and/or otherwise represents the blockchain address C. For ease of explanation, this node can be referred to as node C. Because the transaction graph already includes the node B, the graph component can refrain from inserting another node to represent the blockchain address B. In various aspects, the graph component can insert into the transaction graph an edge between the node C and the node B. In various aspects, this edge can be directed, such that it points away from the node C and toward the node B. In various instances, a weight of this edge can be equal to and/or otherwise based on y. Accordingly, the result can be that the transaction graph includes an edge of weight y that points from the node C to the node B, which can collectively represent that the blockchain address C transferred y Bitcoins to the blockchain address B.

In various instances, the graph component can move on to the third blockchain transaction. Since the graph component can read and/or parse the blockchain, the graph component can discover that, during the third blockchain transaction, the blockchain address D transferred z Bitcoins to the blockchain address E. Accordingly, the graph component can insert into the transaction graph a node that corresponds to and/or otherwise represents the blockchain address D. For ease of explanation, this node can be referred to as node D. Moreover, the graph component can insert into the transaction graph another node that corresponds to and/or otherwise represents the blockchain address E. For ease of explanation, this another node can be referred to as node E. Furthermore, the graph component can insert into the transaction graph an edge between the node D and the node E. In various aspects, this edge can be directed, such that it points away from the node D and toward the node E. In various instances, a weight of this edge can be equal to and/or otherwise based on z. Accordingly, the result can be that the transaction graph includes an edge of weight z that points from the node D to the node E, which can collectively represent that the blockchain address D transferred z Bitcoins to the blockchain address E.

At this point in this non-limiting example, the transaction graph includes three edges and five nodes, which can respectively represent the three blockchain transactions and the five blockchain addresses A-E that are specified in the blockchain. Specifically, the transaction graph can include: an edge of weight x pointing from node A to node B; an edge of weight y pointing from node C to node B; and an edge of weight z pointing from node D to node E.

In various aspects, the community component can electronically execute the community detection algorithm on the transaction graph. In various cases, the community detection algorithm can be configured to identify one or more transaction communities in the transaction graph, where the one or more transaction communities are isolated and non-overlapping. In this non-limiting example, the community detection algorithm can identify two transaction communities: a first transaction community that includes the three nodes A-C, and a second transaction community that includes the two nodes D-E. Indeed, these two transaction communities can be considered as non-overlapping since they do not share any nodes. Moreover, these two transaction communities can be considered as isolated since none of the three nodes A-C is coupled to any of the two nodes D-E.

In various instances, the ranking component can electronically execute the importance-assignment algorithm on each of the one or more transaction communities identified by the community component. In various cases, the importance-assignment algorithm can be configured to receive as input a transaction community and to produce as output a level of importance for each node that is within the inputted transaction community. In various cases, the importance-assignment algorithm can be configured to estimate the level of importance of a node based on the number and/or weight of edges associated with that node and/or based on the estimated levels of importance of other nodes that are coupled to that node. For instance, the ranking component can execute the importance-assignment algorithm on the first transaction community, containing the three nodes A-C. Since the node B has two edges while the nodes A and C each have one edge, the importance-assignment algorithm can, in this non-limiting example, assign a higher level of importance to the node B than to the nodes A and C. Because the nodes A and C each have one edge, and because the nodes A and C are each coupled to the same node B, the importance-assignment algorithm can assign levels of importance to the nodes A and C depending upon the weights of their edges. For example, if the weight x is greater than the weight y, the node A can be assigned a higher level of importance as compared to the node C. On the other hand, if the weight x is less than the weight y, the node A can be assigned a lower level of importance as compared to the node C. In any case, the importance-assignment algorithm can assign a corresponding level of importance to each of the three nodes A-C. In similar fashion, the ranking component can execute the importance-assignment algorithm on the second transaction community, thereby assigning levels of importance to the two nodes D-E.

At this point in this non-limiting example, each node in the transaction graph can have a corresponding level of importance.

In various aspects, the risk component can electronically compute a risk score for each node in the transaction graph, based on the assigned levels of importance. In various cases, the risk score for any given node can be equal to any suitable mathematical function of the level of importance of the given node and/or of at least one other variable associated with the given node. In various instances, the at least one other variable can, for example, include the number of edges pointing away from the given node, the number of edges pointing toward the given node, the number of nodes in the transaction community of the given node, and/or a bit indicating whether the given node has the largest level of importance in its transaction community. In various aspects, the risk score of the given node can be based on a weighted linear combination of the level of importance of the given node and the at least one other variable. More specifically, the risk score can, in various cases, be equal to a reciprocal exponential of such a weighted linear combination. Accordingly, the risk component can compute a risk score for each of the five nodes A-E in this non-limiting example.

For instance, the risk score of the node A can be based on (e.g., can be equal to the reciprocal exponential of) a weighted linear combination of the level of importance of the node A, the number of edges pointing away from the node A (e.g., 1 in this non-limiting example), the number of edges pointing toward the node A (e.g., 0 in this non-limiting example), the number of nodes in the transaction community of the node A (e.g., 3 in this non-limiting example), and/or a bit indicating that the node A does not have the largest level of importance in its transaction community (e.g., since the node B has a higher level of importance than the node A, the bit value for the node A can be 0).

Similarly, the risk score of the node B can be based on (e.g., can be equal to the reciprocal exponential of) a weighted linear combination of the level of importance of the node B, the number of edges pointing away from the node B (e.g., 0 in this non-limiting example), the number of edges pointing toward the node B (e.g., 2 in this non-limiting example), the number of nodes in the transaction community of the node B (e.g., 3 in this non-limiting example), and/or a bit indicating that the node B does have the largest level of importance in its transaction community (e.g., since neither the node A nor the node C has a higher level of importance than the node B, the bit value for the node B can be 1).

Likewise, the risk score of the node C can be based on (e.g., can be equal to the reciprocal exponential of) a weighted linear combination of the level of importance of the node C, the number of edges pointing away from the node C (e.g., 1 in this non-limiting example), the number of edges pointing toward the node C (e.g., 0 in this non-limiting example), the number of nodes in the transaction community of the node C (e.g., 3 in this non-limiting example), and/or a bit indicating that the node C does not have the largest level of importance in its transaction community (e.g., since the node B has a higher level of importance than the node C, the bit value for the node C can be 0).

Moreover, the risk score of the node D can be based on (e.g., can be equal to the reciprocal exponential of) a weighted linear combination of the level of importance of the node D, the number of edges pointing away from the node D (e.g., 1 in this non-limiting example), the number of edges pointing toward the node D (e.g., 0 in this non-limiting example), the number of nodes in the transaction community of the node D (e.g., 2 in this non-limiting example), and/or a bit indicating whether the node D has the largest level of importance in its transaction community.

In like fashion, the risk score of the node E can be based on (e.g., can be equal to the reciprocal exponential of) a weighted linear combination of the level of importance of the node E, the number of edges pointing away from the node E (e.g., 0 in this non-limiting example), the number of edges pointing toward the node E (e.g., 1 in this non-limiting example), the number of nodes in the transaction community of the node E (e.g., 2 in this non-limiting example), and/or a bit indicating whether the node E has the largest level of importance in its transaction community.

In various aspects, the ranking component can electronically transmit such risk scores and/or a risk report summarizing such risk scores to any suitable database and/or computing device, as desired.

As non-limitingly illustrated by the above example, the computerized tool as described herein can be configured to electronically receive as input a blockchain; to electronically construct a transaction graph that represents the blockchain, where nodes of the transaction graph correspond to blockchain addresses specified in the blockchain, and where edges in the transaction graph correspond to blockchain transactions specified in the blockchain; and to electronically produce as output risk scores respectively corresponding to the blockchain addresses, by analyzing the transaction graph via machine learning algorithms (e.g., community detection, importance-assignment).

Various embodiments of the subject innovation can be employed to use hardware and/or software to solve problems that are highly technical in nature (e.g., to facilitate blockchain address risk assessment via graph analysis), that are not abstract and that cannot be performed as a set of mental acts by a human. Further, some of the processes performed can be performed by a specialized computer (e.g., graph builder, machine learning algorithms) for carrying out defined tasks related to blockchain address risk assessment via graph analysis. Some of such processes can include: accessing, by a computer system, a blockchain, wherein the blockchain indicates a set of blockchain transactions that have occurred among a set of blockchain addresses; building, by the computer system, a transaction graph based on the blockchain, wherein nodes of the transaction graph correspond to the set of blockchain addresses, wherein edges of the transaction graph correspond to the set of blockchain transactions, and wherein edge weights of the transaction graph indicate cryptocurrency amounts involved in the set of blockchain transactions; and calculating, by the computer system, risk scores associated with the set of blockchain addresses, based on executing at least one machine learning algorithm on the transaction graph. Such defined tasks are not performed manually by humans. Moreover, neither the human mind nor a human with pen and paper can electronically access a blockchain, electronically build a transaction graph (e.g., digital data structure comprising nodes and edges) based on parsing the blockchain, and/or electronically compute risk scores for blockchain addresses recorded in the blockchain by electronically executing machine learning algorithms on the transaction graph. Instead, various embodiments of the subject innovation are inherently and inextricably tied to computer technology and cannot be implemented outside of a computing environment (e.g., a blockchain is an inherently computerized data object; a computerized tool that can electronically build and analyze a transaction graph based on the blockchain is also an inherently computerized device that cannot be practicably implemented in any sensible way without computers).

In various instances, embodiments of the subject innovation can integrate into a practical application the disclosed teachings regarding blockchain address risk assessment via graph analysis. Indeed, in various embodiments, the disclosed teachings can provide a computerized tool that can electronically receive as input a blockchain that specifies one or more blockchain transactions in which one or more blockchain addresses have participated, and that can electronically calculate risk scores associated with such blockchain addresses by building and analyzing a transaction graph that represents the blockchain. In various cases, such risk scores can be leveraged to aid in blockchain transaction decision making. For example, an entity may have an opportunity to engage in a blockchain transaction with a particular blockchain address. If the risk score of the particular blockchain address is high (e.g., above any suitable threshold value), the entity can decide that engaging with the particular blockchain address is too risky and can thus decline the opportunity. On the other hand, if the risk score of the particular blockchain address is low (e.g., below any suitable threshold value), the entity can decide that engaging with the particular blockchain address is not too risky and can thus accept the opportunity. A computerized tool that can electronically analyze a blockchain so as to assign risk scores to the addresses recorded in the blockchain, where such risk scores can be used for future decision making, is certainly a useful and practical application of computers.

It should be appreciated that the herein figures are non-limiting examples.

FIG. 1 illustrates a high-level block diagram of an example, non-limiting system 100 that can facilitate blockchain address risk assessment via graph analysis in accordance with one or more embodiments described herein.

As shown, a blockchain risk assessment system 102 can be electronically integrated, via any suitable wired and/or wireless electronic connection, with a blockchain 104. In various aspects, the blockchain 104 can be any suitable type of blockchain in which a set of blockchain addresses 106 can be electronically recorded/documented and/or in which a set of blockchain transactions 108 can be electronically recorded/documented. In various instances, the set of blockchain addresses 106 can include any suitable number of blockchain addresses. Similarly, the set of blockchain transactions 108 can include any suitable number of blockchain transactions. In various instances, the set of blockchain transactions 108 can have occurred between and/or among the set of blockchain addresses 106. Accordingly, the blockchain 104 can be considered as a digital record of the set of blockchain transactions 108 in which the set of blockchain addresses 106 participated.

More specifically, the blockchain 104 can be a decentralized digital ledger made up of a sequence of electronic blocks. In various instances, any given electronic block can include a timestamp (e.g., time and/or date) associated with one or more blockchain transactions (e.g., some of the set of blockchain transactions 108). In various cases, the given electronic block can also include metadata pertaining to the one or more blockchain transactions, such as amounts and/or types of cryptocurrency involved in the one or more blockchain transactions, and/or such as one or more blockchain addresses (e.g., some of the set of blockchain addresses 106) to which and/or from which such amounts and/or types of cryptocurrency were transferred. In some cases, the given electronic block can further include metadata pertaining to the one or more blockchain addresses, such as age of a blockchain address (e.g., days, months, and/or years since registration and/or creation of the blockchain address) and/or number of smart contract tokens obtained by a blockchain address. Moreover, in various aspects, the given electronic block can include any suitable cryptographic hash of the preceding electronic block. In various instances, because each electronic block in the blockchain 104 can include a cryptographic hash of the previous electronic block, the blockchain 104 can be resistant to retroactive tampering and/or falsification.

Again, the blockchain 104 can be considered as a digital record of the set of blockchain transactions 108 that have been performed by the set of blockchain addresses 106. In other words, the blockchain 104 can be considered as conveying past transactional behaviors of the set of blockchain addresses 106. In various aspects, it can be useful to assign risk scores to each of the set of blockchain addresses 106. Indeed, when any suitable entity is given an opportunity to transact with any of the set of blockchain addresses 106, the entity can leverage such risk scores to determine whether to accept or decline such transaction opportunity. For instance, if a specific blockchain address is associated with a high risk score (e.g., exceeding any suitable threshold value), transacting with the specific blockchain address can be considered as too risky. On the other hand, if a specific blockchain address is associated with a low risk score (e.g., beneath any suitable threshold value), transacting with the specific blockchain address can be considered as not too risky. As explained herein, the blockchain risk assessment system 102 can electronically analyze the blockchain 104, so as to electronically compute such risk scores for the set of blockchain addresses 106.

Applicant notes that computer operations and efficiency are improved by the prevention of a potentially fraudulent blockchain transaction. A fraudulent transaction is an unnecessary transaction (e.g. one the user would not willingly engage in). This transaction requires computing power, memory usage, energy usage, and network usage by the user's computer system, all of which can be conserved if the user does not participate in the transaction. Additionally, in the case of some blockchain transactions (such as BitCoin), there may be a heavy energy usage and computing power cost by a variety of mining systems to confirm the transaction within the relevant blockchain. This energy usage can also be conserved if the potentially fraudulent transaction is not entered into by the user.

In various embodiments, the blockchain risk assessment system 102 can comprise a processor 110 (e.g., computer processing unit, microprocessor) and a computer-readable memory 112 that is operably and/or operatively and/or communicatively connected/coupled to the processor 110. The memory 112 can store computer-executable instructions which, upon execution by the processor 110, can cause the processor 110 and/or other components of the blockchain risk assessment system 102 (e.g., receiver component 114, graph component 116, community component 118, ranking component 120, and/or risk component 122) to perform one or more acts. In various embodiments, the memory 112 can store computer-executable components (e.g., receiver component 114, graph component 116, community component 118, ranking component 120, and/or risk component 122), and the processor 110 can execute the computer-executable components.

In various embodiments, the blockchain risk assessment system 102 can comprise a receiver component 114. In various aspects, the blockchain 104 can be electronically maintained and/or stored in any suitable databases (not shown) and/or computing devices (not shown) that are remote from and/or local to the receiver component 114. In various instances, the receiver component 114 can electronically receive and/or retrieve, via any suitable data communication and/or data querying technique, the blockchain 104 from such databases and/or computing devices. That is, the receiver component 114 can electronically access the blockchain 104, such that other components of the blockchain risk assessment system 102 can electronically read, parse, and/or otherwise interact with the blockchain 104.

In various embodiments, the blockchain risk assessment system 102 can comprise a graph component 116. In various aspects, the graph component 116 can electronically build a transaction graph based on the blockchain 104. More specifically, the graph component 116 can electronically read, parse, and/or decrypt the blockchain 104, which can cause the graph component 116 to identify the set of blockchain addresses 106 and/or the set of blockchain transactions 108. Accordingly, the graph component 116 can insert, into a graph structure, nodes that respectively correspond to the set of blockchain addresses 106 and/or edges that respectively correspond to the set of blockchain transactions 108. In various instances, the graph component can tag the nodes of the graph structure with any suitable information pertaining to the set of blockchain addresses 106 (e.g., blockchain address age, smart contract tokens). In various cases, such information can be contained within the blockchain 104 and thus can be identified by the graph component 116 when reading/parsing the blockchain 104. In various other cases, such information can be contained in any other suitable database (not shown) that is electronically accessible to the receiver component 114. Similarly, in various aspects, the graph component 116 can tag the edges of the graph structure with any suitable information pertaining to the set of blockchain transactions 108 (e.g., amount of cryptocurrency transferred, type of cryptocurrency transferred, time/date when cryptocurrency was transferred). In various cases, the graph structure, which can be referred to as the transaction graph, can be considered as representing the blockchain 104.

In various embodiments, the blockchain risk assessment system 102 can comprise a community component 118. In various aspects, the community component 118 can electronically execute a community detection algorithm on the transaction graph generated by the graph component 116. In various instances, the community detection algorithm can be any suitable machine learning algorithm (and/or non-machine learning algorithm, in some cases) that can be configured to break up the transaction graph into one or more transaction communities. In various cases, a transaction community can be a collection of nodes (e.g., a subset of the transaction graph). In some aspects, the one or more transaction communities can be non-overlapping. That is, no node in the transaction graph can belong to more than one transaction community. In some instances, the one or more transaction communities can be isolated from each other. That is, no node can be connected by an edge to any node that belongs to a different transaction community. In other instances, the one or more transaction communities can be non-isolated. For example, in some cases, a node can be coupled by a low-weight edge to a node that belongs to a different transaction community. In any case, the community component 118 can identify the one or more transaction communities within the transaction graph, by executing the community detection algorithm on the transaction graph.

In various embodiments, the blockchain risk assessment system 102 can comprise a ranking component 120. In various aspects, the ranking component 120 can electronically execute an importance-assignment algorithm on each of the one or more transaction communities identified by the community component 118. In various instances, the importance-assignment algorithm can be any suitable machine learning algorithm (and/or non-machine learning algorithm, in some cases) that can be configured to assign a level of importance to each node in an inputted transaction community. More specifically, for any given node that belongs to an inputted transaction community, the importance-assignment algorithm can estimate a level of importance of the given node, based on the edges of the given node and/or based on the estimated levels of importance of other nodes that are coupled to the given node. Accordingly, nodes that have more numerous edges, that have more heavily weighted edges, and/or that are coupled to more important nodes can themselves have higher levels of importance. In any case, the ranking component 120 can assign a level of importance to each node in each of the one or more transaction communities, by executing the importance-assignment algorithm on each of the one or more transaction communities.

In various embodiments, the blockchain risk assessment system 102 can comprise a risk component 122. In various aspects, the risk component 122 can electronically calculate a risk score for each node in the transaction graph, based on at least the level of importance of each node. In various instances, the risk component 122 can employ a risk formula to compute such risk scores. In various cases, the risk formula can be any suitable mathematical function that takes as an argument the level of importance of a given node. In various aspects, the risk formula can also take as an argument any other suitable information pertaining to the given node (e.g., number of edges of the given node, size of the transaction community of the given node, age of the blockchain address represented by the given node). Accordingly, the risk component 122 can apply the risk formula to each node in the transaction graph, thereby computing a risk score for each node. In various cases, the risk component 122 can electronically transmit such risk scores to any suitable computing device (not shown), as desired.

Figure 2:
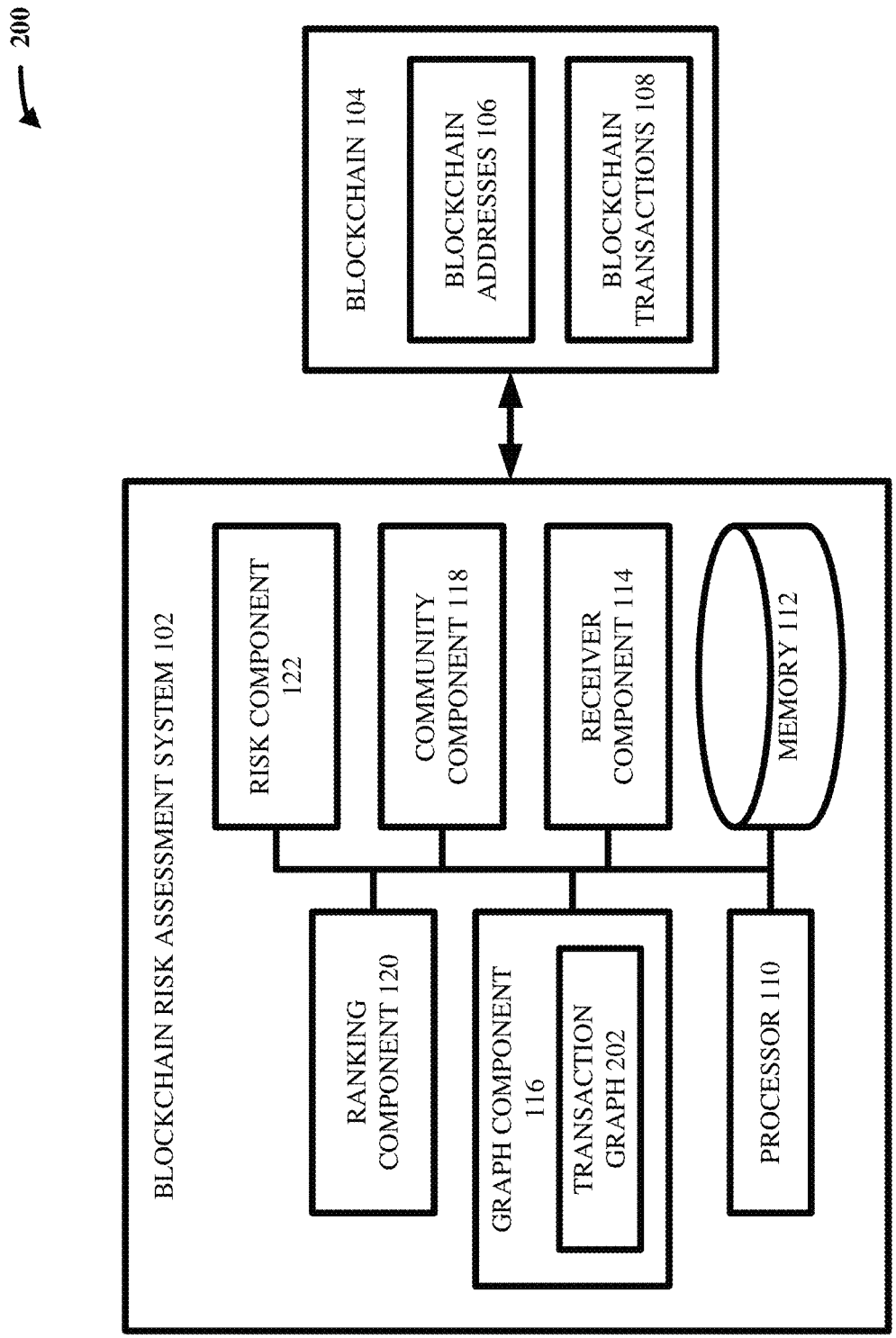
FIG. 2 illustrates a high-level block diagram of an example, non-limiting system including a transaction graph that facilitates blockchain address risk assessment via graph analysis in accordance with one or more embodiments described herein.

FIG. 2 illustrates a high-level block diagram of an example, non-limiting system 200 including a transaction graph that can facilitate blockchain address risk assessment via graph analysis in accordance with one or more embodiments described herein. As shown, the system 200 can, in some cases, comprise the same components as the system 100, and can further comprise a transaction graph 202.

In various embodiments, the graph component 116 can electronically build, construct, and/or otherwise create the transaction graph 202, based on the blockchain 104. In various aspects, as mentioned above, the blockchain 104 can be considered as a digital ledger that specifies the set of blockchain transactions 108 that have been performed by the set of blockchain addresses 106. In other words, the blockchain 104 can be considered as conveying the transaction histories of the set of blockchain addresses 106. In various instances, the graph component 116 can read and/or parse the blockchain 104 via any suitable data querying technique. Such reading and/or parsing can cause the graph component 116 to identify the set of blockchain addresses 106 and/or to identify the set of blockchain transactions 108. In various cases, the graph component 116 can electronically generate the transaction graph 202, such that nodes of the transaction graph 202 respectively correspond to the set of blockchain addresses 106 and/or such that edges of the transaction graph 202 respectively correspond to the set of blockchain transactions 108.

More specifically, the graph component 116 can initialize the transaction graph 202 as an empty graph structure and can iteratively insert nodes and/or edges into the transaction graph 202 by iterating through each of the set of blockchain transactions 108 that are recorded in the blockchain 104. For example, consider any given blockchain transaction that is in the set of blockchain transactions 108. In various aspects, the blockchain 104 can indicate an amount of cryptocurrency that was transferred during that given blockchain transaction. Additionally, the blockchain 104 can indicate a first blockchain address that is in the set of blockchain addresses 106 and that transferred and/or paid the indicated amount of cryptocurrency during the given blockchain transaction. Furthermore, the blockchain 104 can indicate a second blockchain address that is in the set of blockchain addresses 106 and that received and/or was paid the indicated amount of cryptocurrency during the given blockchain transaction. Because the graph component 116 can read and/or parse the blockchain 104, the graph component 116 can identify the indicated amount of cryptocurrency, the first blockchain address, and the second blockchain address. In various cases, the graph component 116 can insert into the transaction graph 202 a first node to represent the first blockchain address, if the first blockchain address is not already represented by a node in the transaction graph 202. Similarly, in various aspects, the graph component 116 can insert into the transaction graph 202 a second node to represent the second blockchain address, if the second blockchain address is not already represented by a node in the transaction graph 202. In various instances, the graph component 116 can also insert into the transaction graph 202 an edge that couples the first node to the second node. In various cases, the edge can be directed away from the first node (e.g., away from the blockchain address that transferred cryptocurrency during the given blockchain transaction) and toward the second node (e.g., toward the blockchain address that received cryptocurrency during the given blockchain transaction). Such directionality can correspond to the direction in which cryptocurrency was transferred during the given blockchain transaction. Moreover, the edge can be weighted. For instance, the weight of the edge can be equal to and/or otherwise based on the indicated amount of cryptocurrency that was transferred during the given blockchain transaction. In various aspects, the graph component 116 can repeat this procedure, until each of the set of blockchain addresses 106 is represented by a corresponding node in the transaction graph 202 and until each of the set of blockchain transactions 108 is represented by a corresponding edge in the transaction graph 202.

Figure 3:
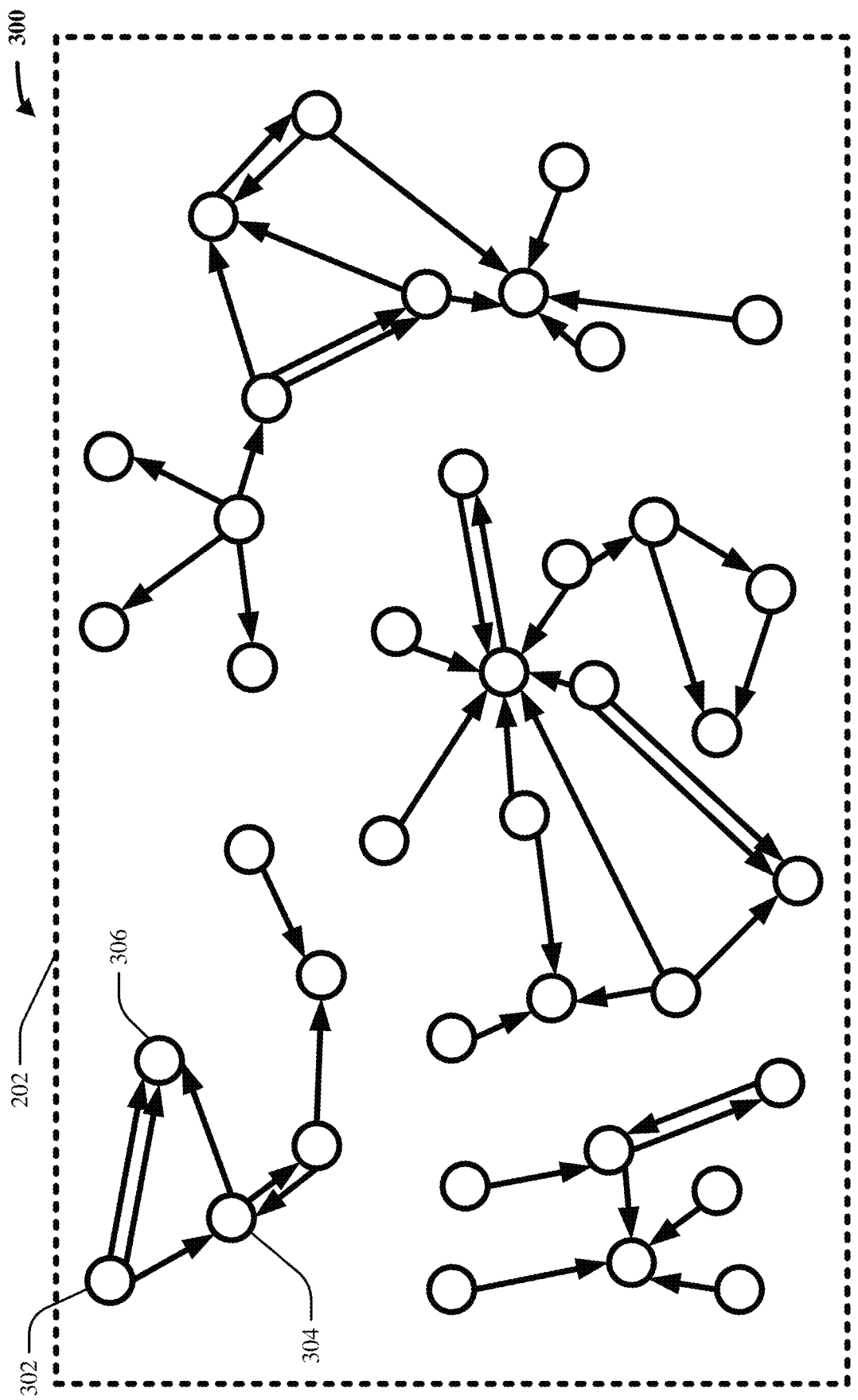
FIG. 3 illustrates a high-level block diagram of an example, non-limiting transaction graph in accordance with one or more embodiments described herein.

FIG. 3 illustrates a high-level block diagram of an example, non-limiting transaction graph in accordance with one or more embodiments described herein. In other words, FIG. 3 depicts an example, non-limiting embodiment of the transaction graph 202.

As shown in FIG. 3, nodes of the transaction graph 202 can be represented by circles, and edges of the transaction graph 202 can be represented by arrows. As explained above, the nodes of the transaction graph 202 can each respectively correspond to the set of blockchain addresses 106, and the edges of the transaction graph 202 can each respectively correspond to the set of blockchain transactions 108. That is, each node in the transaction graph 202 can represent a corresponding blockchain address, and each edge in the transaction graph 202 can represent a corresponding blockchain transaction between a pair of blockchain addresses. In various aspects, if an edge in the transaction graph 202 points away from a node in the transaction graph 202, this can indicate a blockchain transaction in which the blockchain address corresponding to the node transferred and/or paid cryptocurrency. Similarly, if an edge in the transaction graph 202 points toward a node in the transaction graph 202, this can indicate a blockchain transaction in which the blockchain address corresponding to the node received and/or was paid cryptocurrency.

For example and for purposes of illustration, FIG. 3 calls out a node 302, a node 304, and a node 306. As shown, there can be an edge pointing away from the node 302 and toward the node 304, which can indicate a blockchain transaction in which the blockchain address corresponding to the node 302 paid cryptocurrency to the blockchain address corresponding to the node 304. Similarly, there can be an edge pointing away from the node 304 and toward the node 306, which can indicate a blockchain transaction in which the blockchain address corresponding to the node 304 paid cryptocurrency to the blockchain address corresponding to the node 306. Likewise, there can be two edges pointing away from the node 302 and toward the node 306, which can indicate two different blockchain transactions in which the blockchain address corresponding to the node 302 paid cryptocurrency to the blockchain address corresponding to the node 306.

In this fashion, each node in the transaction graph 202 can represent and/or otherwise correspond to a unique blockchain address in the set of blockchain addresses 106, and each edge in the transaction graph 202 can represent and/or otherwise correspond to a unique blockchain transaction in the set of blockchain transactions 108, where the direction of the edge can indicate a direction of transference of cryptocurrency. Indeed, if two blockchain addresses engaged in n blockchain transactions with each other, for any suitable positive integer n, the transaction graph 202 can include n directed edges between two nodes that respectively represent those two blockchain addresses.

Although not explicitly shown in FIG. 3, the edges of the transaction graph 202 can be weighed. In various cases, the weight of a given edge can be equal to and/or otherwise based on an amount of cryptocurrency that was transferred in the blockchain transaction corresponding to that edge. For example, if the blockchain address corresponding to the node 302 transferred a units of cryptocurrency to the blockchain address corresponding to the node 304, for any suitable positive real number a, the edge between the node 302 and the node 304 can have a weight equal to a.

In various cases, an edge in the transaction graph 202 can be tagged with any other suitable information, as desired. For example, an edge can be tagged with a timestamp that indicates the time and/or date at which the blockchain transaction corresponding to the edge occurred. As another example, an edge can be tagged with a cryptocurrency identifier that indicates the type and/or name of cryptocurrency that was transferred in the blockchain transaction corresponding to the edge. Similarly, in various cases, a node in the transaction graph 202 can be tagged with any suitable information, as desired. For example, a node can be tagged with an identifier of the blockchain address that corresponds to the node. As another example, a node can be tagged with an age of the blockchain address that corresponds to the node (e.g., age of a blockchain address can be an amount of time that has elapsed since that blockchain address was created and/or registered). As yet another example, a node can be tagged with a number of smart contract tokens that have been earned and/or otherwise obtained by the blockchain address that corresponds to the node.

Figure 4:
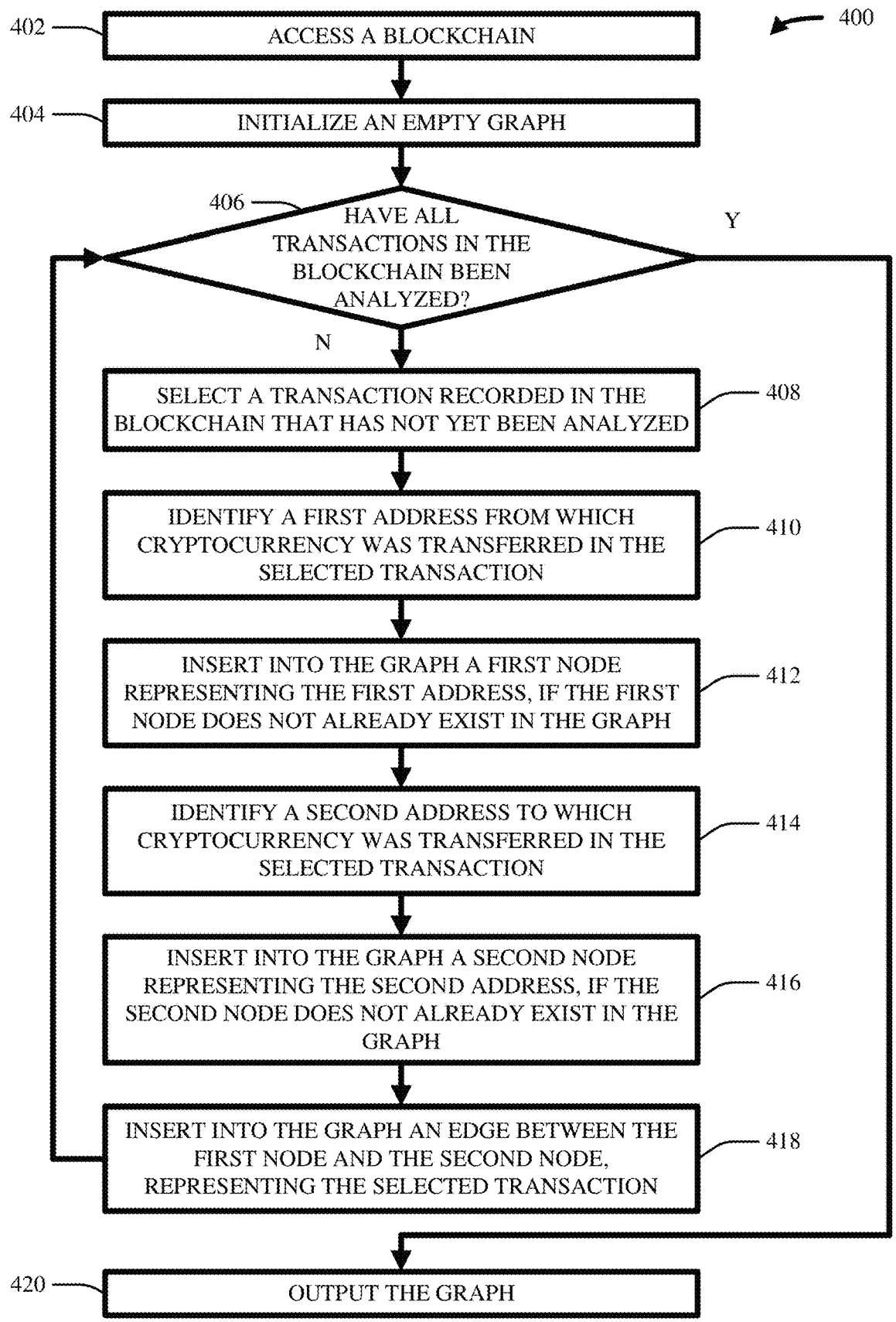
FIG. 4 illustrates a high-level flow diagram of an example, non-limiting computer-implemented method that facilitates the creation of a transaction graph in accordance with one or more embodiments described herein.

FIG. 4 illustrates a high-level flow diagram of an example, non-limiting computer-implemented method 400 that can facilitate the creation of a transaction graph in accordance with one or more embodiments described herein. In various cases, the blockchain risk assessment system 102 can facilitate the computer-implemented method 400.

In various embodiments, act 402 can include accessing, by a computer system (e.g., 114), a blockchain (e.g., 104). That is, the computer system can, in various cases, electronically interact with the blockchain in any suitable fashion so as to read information contained within the blockchain.

In various aspects, act 404 can include initializing, by the computer system (e.g., 116), an empty graph (e.g., 202, before any nodes and/or edges are inserted).

In various instances, act 406 can include determining, by the computer system (e.g., 116), whether all transactions (e.g., 108) that are recorded in the blockchain have been analyzed by the computer system. If yes, the computer-implemented method 400 can proceed to act 420. If not, the computer-implemented method 400 can proceed to act 408.

In various cases, act 408 can include selecting, by the computer system (e.g., 116), a transaction (e.g., one of 108) recorded in the blockchain that has not yet been analyzed by the computer system. In various instances, if the computer system has not yet iterated through acts 406-418 of the computer-implemented method 400, it can be the case that none of the transactions recorded in the blockchain have yet been analyzed by the computer system. In various other instances, if the computer system has already iterated through acts 406-418 q times for any suitable positive integer q, it can be the case that q of the transactions recorded in the blockchain have already been analyzed by the computer system.

In various aspects, act 410 can include identifying, by the computer system (e.g., 116), a first address (e.g., one of 106) from which cryptocurrency was transferred in the selected transaction. In various cases, this can be facilitated by reading and/or parsing, via the computer system, information contained within the blockchain regarding the selected transaction.

In various instances, act 412 can include inserting, by the computer system (e.g., 116), into the graph a first node (e.g., 302) representing the first address, if the first node does not already exist in the graph (e.g., if the first address is not already represented by a node in the graph). In various cases, the first node can be tagged with any suitable information pertaining to the first address (e.g., identifier of the first address, age of the first address, number of smart contract tokens possessed by the first address).

In various aspects, act 414 can include identifying, by the computer system (e.g., 116), a second address (e.g., another of 106) to which cryptocurrency was transferred in the selected transaction. As mentioned above, in various cases, this can be facilitated by reading and/or parsing, via the computer system, information contained within the blockchain regarding the selected transaction.

In various instances, act 416 can include inserting, by the computer system (e.g., 116), into the graph a second node (e.g., 304) representing the second address, if the second node does not already exist in the graph (e.g., if the second address is not already represented by a node in the graph). In various cases, the second node can be tagged with any suitable information pertaining to the second address (e.g., identifier of the second address, age of the second address, number of smart contract tokens possessed by the second address).

In various aspects, act 418 can include inserting, by the computer system (e.g., 116), into the graph an edge between the first node and the second node, representing the selected transaction. In various cases, the edge can be directed so as to convey a direction in which cryptocurrency was transferred during the selected transaction (e.g., the edge can point away from the first node and toward the second node). In various cases, the edge can be weighted so as to convey an amount of cryptocurrency that was transferred during the selected transaction (e.g., the weight of the edge can be equal to the amount of cryptocurrency transferred). In various cases, the edge can be tagged with any other suitable information pertaining to the selected transaction (e.g., timestamp of the selected transaction, type of cryptocurrency transferred). As shown, the computer-implemented method 400 can proceed back to act 406.

In various instances, act 420 can include outputting, by the computer system (e.g., 116), the graph.

Figure 5:
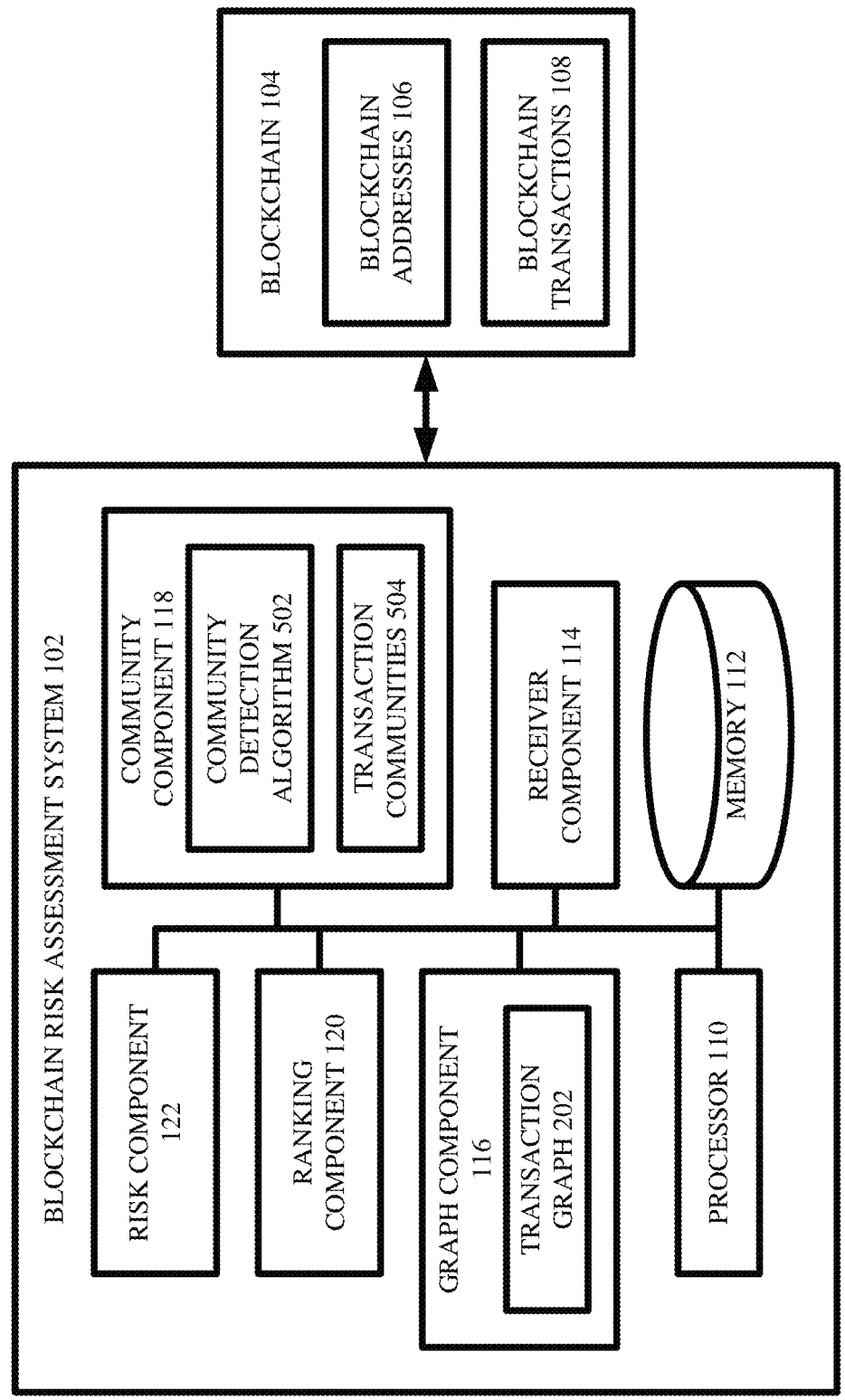
FIG. 5 illustrates a high-level block diagram of an example, non-limiting system including a community detection algorithm and transaction communities that facilitates blockchain address risk assessment via graph analysis in accordance with one or more embodiments described herein.

FIG. 5 illustrates a high-level block diagram of an example, non-limiting system 500 including a community detection algorithm and transaction communities that can facilitate blockchain address risk assessment via graph analysis in accordance with one or more embodiments described herein. As shown, the system 500 can, in some cases, comprise the same components as the system 200, and can further comprise a community detection algorithm 502 and/or a set of transaction communities 504.

In various embodiments, the community component 118 can electronically execute the community detection algorithm 502 on the transaction graph 202, thereby yielding the set of transaction communities 504. In various aspects, the community detection algorithm 502 can be any suitable link analysis and/or graph analysis algorithm that is configured to decompose a graph into one or more subgraphs, by analyzing the edges and/or edge weights of the graph. When executed on the transaction graph 202, the community detection algorithm 502 can identify the set of transaction communities 504 within the transaction graph 202. In various instances, the set of transaction communities 504 can include any suitable number of transaction communities. In various cases, a transaction community can be a subset of the nodes and/or edges that are in the transaction graph 202. In other words, the community detection algorithm 502 can be considered as assigning each node of the transaction graph 202 to a corresponding transaction community, based on the edges of the node.

In various aspects, the community detection algorithm 502 can be configured to identify the set of transaction communities 504, such that the set of transaction communities 504 are non-overlapping with each other. That is, it can be the case that no node in the transaction graph 202 can be a member of more than one transaction community.

Furthermore, in various instances, the community detection algorithm 502 can be configured to identify the set of transaction communities 504, such that the set of transaction communities 504 are isolated from each other. That is, it can be the case that no node in the transaction graph 202 is coupled to any node that is outside of its transaction community. In various other instances, however, the community detection algorithm 502 can be configured to identify the set of transaction communities 504, such that the set of transaction communities 504 are not fully isolated from each other. For example, in some cases, the set of transaction communities 504 can be weakly coupled together. That is, it can be the case that a node is coupled by an edge to another node that is outside of its transaction community, provided that the weight of the edge is sufficiently small (e.g., is below any suitable threshold value). In various other cases, the set of transaction communities 504 can exhibit any other suitable level of isolation and/or coupling with each other.

In various cases, non-limiting examples of the community detection algorithm 502 can include depth-first-search-based algorithms, such as Kosaraju's algorithm, Tarjan's algorithm, and/or the path-based strong component algorithm. In various aspects, other non-limiting examples of the community detection algorithm 502 can include reachability algorithms, the Louvain community detection algorithm, the Surprise community detection algorithm, the Leiden community detection algorithm, and/or the Walktrap community detection algorithm. In various instances, the community detection algorithm 502 can be any other suitable algorithm and/or technique which can identify the set of transaction communities 504 within the transaction graph 202.

Figure 6:
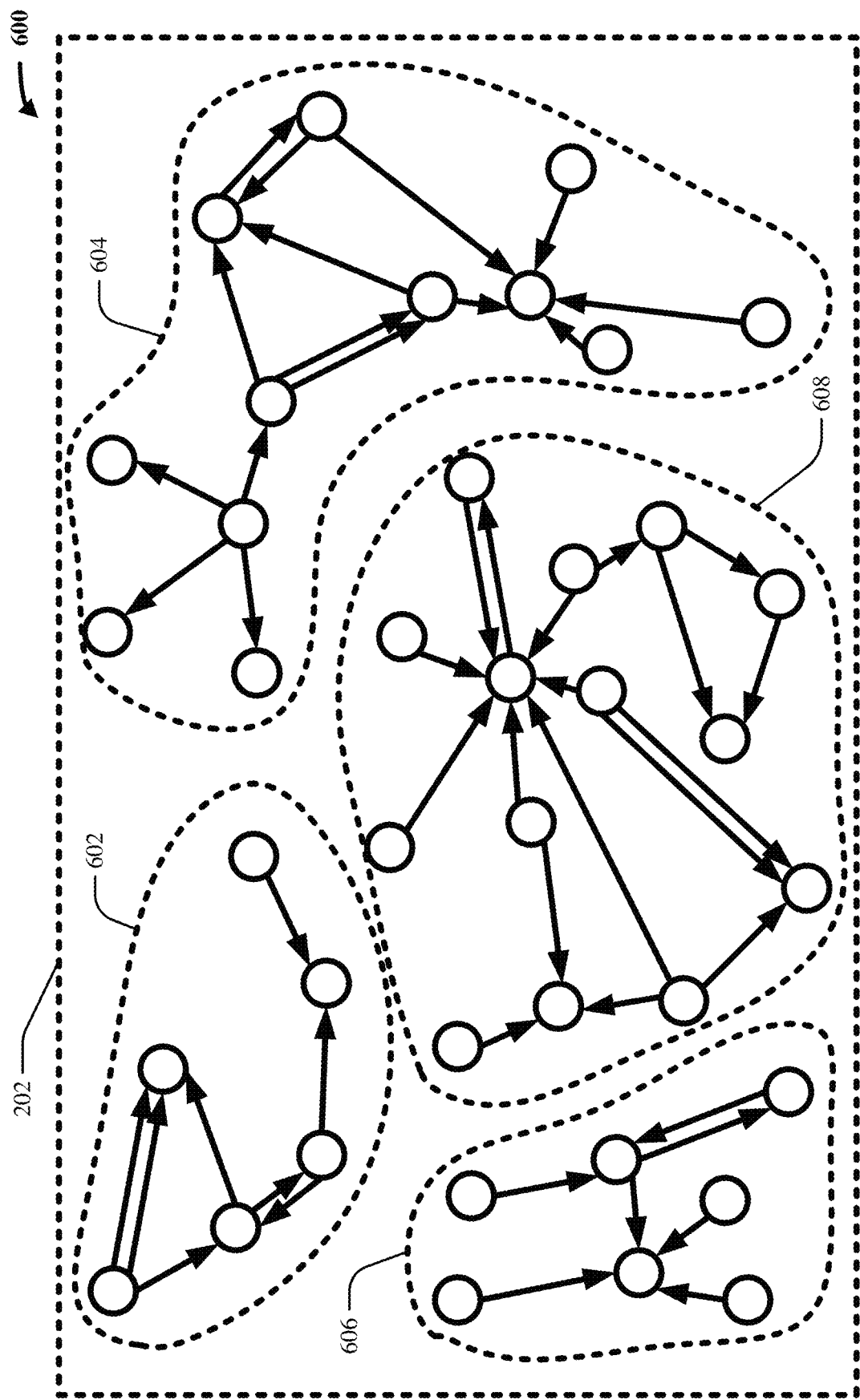
FIG. 6 illustrates a high-level block diagram of an example, non-limiting transaction graph including a set of transaction communities in accordance with one or more embodiments described herein.

FIG. 6 illustrates a high-level block diagram of an example, non-limiting transaction graph including a set of transaction communities in accordance with one or more embodiments described herein. That is, FIG. 6 depicts a non-limiting example of the transaction graph 202 once the community detection algorithm 502 has been executed.

As shown, the community detection algorithm 502 can, in various aspects, separate the nodes and/or edges of the transaction graph 202 into four transaction communities: 602-608. In other words, the set of transaction communities 504 can include the transaction community 602, the transaction community 604, the transaction community 606, and/or the transaction community 608. Although FIG. 6 depicts four transaction communities 602-608, this is a mere non-limiting example. In various instances, there can be any suitable number of transaction communities in the set of transaction communities 504.

As mentioned above, the community detection algorithm 502 can be configured to identify the set of transaction communities 504, such that the set of transaction communities 504 are non-overlapping and isolated from each other. FIG. 6 depicts such non-overlapping and isolated transaction communities.

Indeed, the transaction communities 602-608 are depicted as being non-overlapping, since they do not share any nodes with each other. As shown in the non-limiting embodiment of the transaction graph 202 that is depicted in FIG. 6, each node in the transaction graph 202 can be assigned to no more than one transaction community. In other words, no node in the transaction graph 202 can be assigned to more than one transaction community, in the non-limiting example shown.

Moreover, the transaction communities 602-608 are depicted as being isolated from each other, since they are not coupled to each other by any edges. As shown in the non-limiting embodiment of the transaction graph 202 that is depicted in FIG. 6, each node in the transaction community 602 is coupled only to other nodes that are also within the transaction community 602; no node in the transaction community 602 is coupled to a node that is within any of the transaction communities 604-608. Similarly, each node in the transaction community 604 is coupled only to other nodes that are also within the transaction community 604, each node in the transaction community 606 is coupled only to other nodes that are also within the transaction community 606, and each node in the transaction community 608 is coupled only to other nodes that are also within the transaction community 608.

Because each node in the transaction graph 202 can represent a blockchain address, and because each edge in the transaction graph 202 can represent a blockchain transaction, each of the transaction communities 602-608 can represent groups of blockchain addresses that have transacted with each other. For instance, the nodes of the transaction community 602 can represent blockchain addresses that have transacted with each other and that have not transacted with any blockchain addresses represented by the nodes of the transaction communities 604-608. Similarly, the nodes of the transaction community 604 can represent blockchain addresses that have transacted with each other and that have not transacted with any blockchain addresses represented by the nodes of the transaction communities 602, 606, and 608. Likewise, the nodes of the transaction community 606 can represent blockchain addresses that have transacted with each other and that have not transacted with any blockchain addresses represented by the nodes of the transaction communities 602, 604, and 608. In like fashion, the nodes of the transaction community 608 can represent blockchain addresses that have transacted with each other and that have not transacted with any blockchain addresses represented by the nodes of the transaction communities 602-606.

Figure 7:
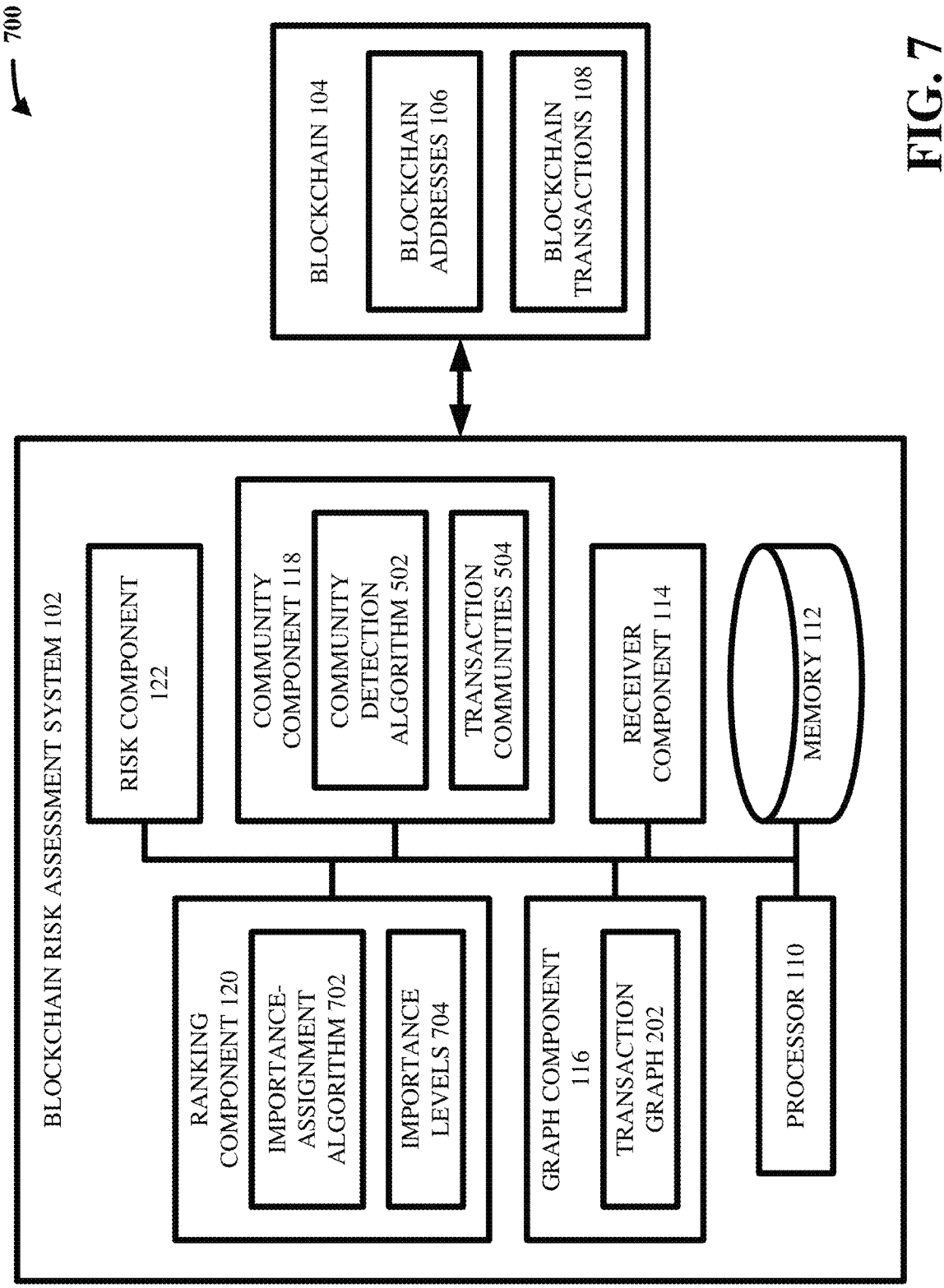
FIG. 7 illustrates a high-level block diagram of an example, non-limiting system including an importance-assignment algorithm and importance levels that facilitates blockchain address risk assessment via graph analysis in accordance with one or more embodiments described herein.

FIG. 7 illustrates a high-level block diagram of an example, non-limiting system 700 including an importance-assignment algorithm and importance levels that can facilitate blockchain address risk assessment via graph analysis in accordance with one or more embodiments described herein. As shown, the system 700 can, in some cases, comprise the same components as the system 500, and can further comprise an importance-assignment algorithm 702 and/or a set of importance levels 704.

In various embodiments, the ranking component 120 can electronically execute the importance-assignment algorithm 702 on each of the set of transaction communities 504, thereby yielding the set of importance levels 704. In various aspects, the importance-assignment algorithm 702 can be any suitable link analysis and/or graph analysis algorithm that is configured to estimate levels of importance of the nodes of a graph, by analyzing the edges and/or weights of the graph. When executed on any given transaction community in the set of transaction communities 504, the importance-assignment algorithm 702 can assign to the nodes of that given transaction community levels of importance, based on the edges in that given transaction community. Once the importance-assignment algorithm 702 has been executed on each of the set of transaction communities 504, each of the nodes in the transaction graph 202 can have been assigned a corresponding importance level. Such importance levels can collectively be considered as the set of importance levels 704. In other words, the set of importance levels 704 can include one importance level for each of the nodes in the transaction graph 202 and thus for each of the set of blockchain addresses 106. In various aspects, an importance level can be a scalar (and/or, in some cases, a vector, a matrix, and/or a tensor) that can numerically represent how important a node is within the node's transaction community. Thus, by assigning and/or estimating the levels of importance of the nodes in any given transaction community, the importance-assignment algorithm 702 can be considered as ranking the nodes of the given transaction community in order of importance.

In various aspects, the importance-assignment algorithm 702 can be configured to estimate a level of importance of any given node, based on the number and/or weights of edges of that given node and/or based on the estimated levels of importance of other nodes that are coupled to that given node. Thus, in various cases, the level of importance of the given node can increase as the number of edges of the given node increases, and the level of importance of the given node can decrease as the number of edges of the given node decreases. Similarly, in various instances, the level of importance of the given node can increase as the weights of the edges of the given node increase, and the level of importance of the given node can decrease as the weights of the edges of the given node decrease. Likewise, in various aspects, the level of importance of the given node can increase as the levels of importance of other nodes to which the given node is coupled increase, and the level of importance of the given node can decrease as the levels of importance of other nodes to which the given node is coupled decrease. Accordingly, if a first node in a transaction community has a higher level of importance than a second node in the transaction community, it can be due to: the first node having sufficiently more edges than the second node; the first node having sufficiently heavier edges than the second node; the nodes that are coupled to the first node being sufficiently more important than the nodes that are coupled to the second node; and/or any suitable combination thereof.

In various aspects, as a non-limiting example, the importance-assignment algorithm 702 can be the PageRank algorithm. In various cases, when the importance-assignment algorithm 702 is (and/or is otherwise based on) the PageRank algorithm, the level of importance of a node can be referred to as the pagerank measure of the node. In various instances, as another non-limiting example, the importance-assignment algorithm can be the Hyperlink-Induced Topic Search (HITS) algorithm.

Figure 8:
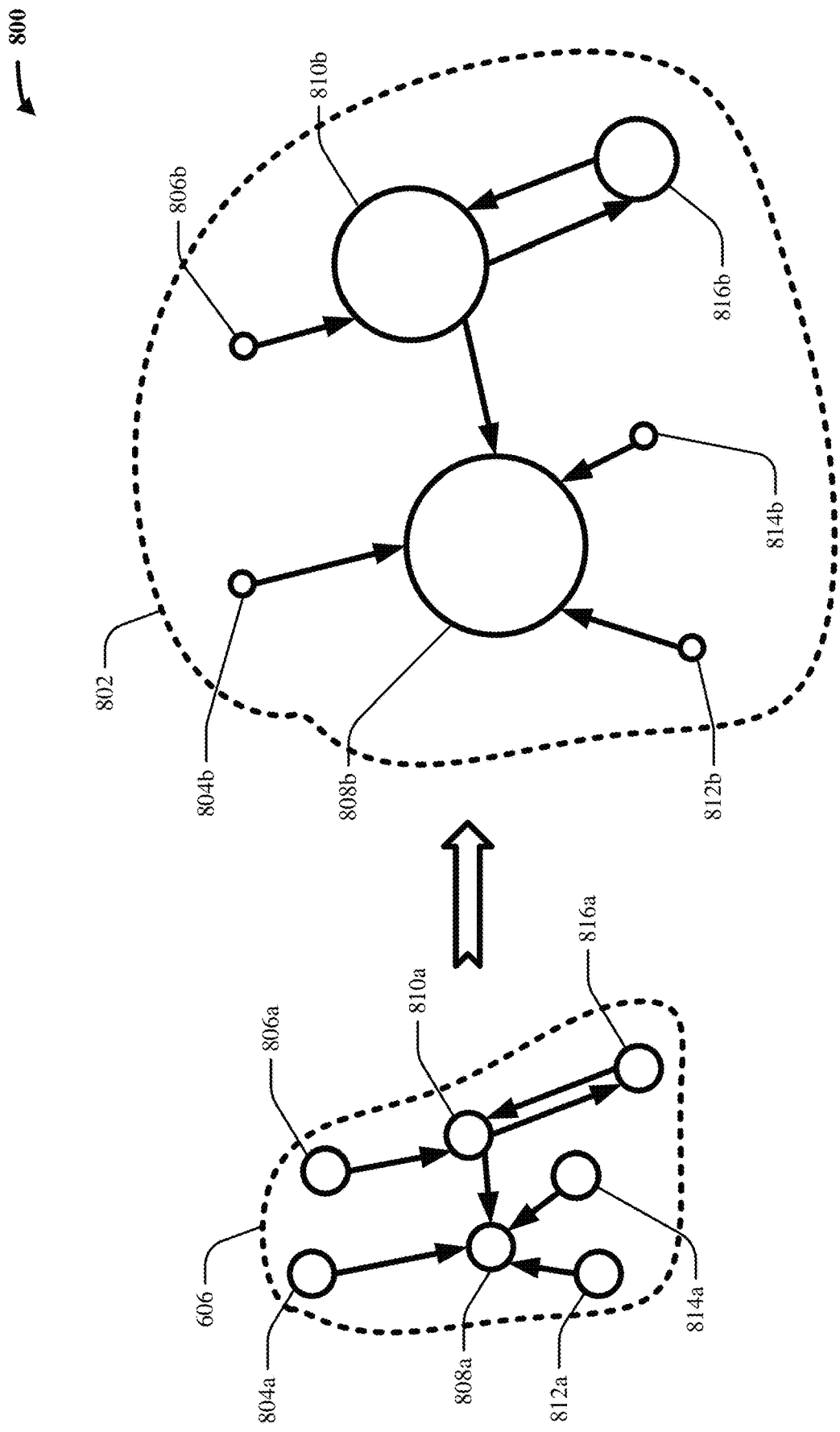
FIG. 8 illustrates a high-level block diagram of an example, non-limiting transaction community having nodes with different importance levels in accordance with one or more embodiments described herein.

FIG. 8 illustrates a high-level block diagram of an example, non-limiting transaction community having nodes with different importance levels in accordance with one or more embodiments described herein. More specifically, FIG. 8 depicts the transaction community 606 and an example, non-limiting result obtained by executing the importance-assignment algorithm 702 on the transaction community 606.

As shown, the transaction community 606 can comprise seven nodes 804a-816a and seven edges: a first edge pointing from the node 804a to the node 808a; a second edge pointing from the node 806a to the node 810a; a third edge pointing from the node 812a to the node 808a; a fourth edge pointing from the node 814a to the node 808a; a fifth edge pointing from the node 810a to the node 808a; a sixth edge pointing from the node 810a to the node 816a; and a seventh edge pointing from the node 816a to the node 810a. Although not explicitly shown in FIG. 8, the edges of the transaction community 606 can be weighted, as described above.

In various aspects, the ranking component 120 can execute the importance-assignment algorithm 702 on the transaction community 606. This can result in the estimation of seven levels of importance: one level of importance for each of the seven nodes 804a-816a. In various instances, each of the seven nodes 804a-816a can be tagged with its corresponding level of importance. In various cases, the size of each of the seven nodes 804a-816a can be changed so as to be proportional to and/or otherwise based on its corresponding level of importance. This is non-limitingly shown as a transaction community 802.

In various aspects, the transaction community 802 can be a result obtained by executing the importance-assignment algorithm 702 on the transaction community 606. As shown, the transaction community 802 can comprise seven nodes 804b-816b and seven edges: a first edge pointing from the node 804b to the node 808b; a second edge pointing from the node 806b to the node 810b; a third edge pointing from the node 812b to the node 808b; a fourth edge pointing from the node 814b to the node 808b; a fifth edge pointing from the node 810b to the node 808b; a sixth edge pointing from the node 810b to the node 816b; and a seventh edge pointing from the node 816b to the node 810b. Moreover, the edges of the transaction community 802 can have the same weights as those in the transaction community 606. In other words, the transaction community 802 can be topologically equivalent to the transaction community 606.

However, as shown, the nodes in the transaction community 802 can be sized according to their corresponding levels of importance, while the nodes in the transaction community 606 can be uniformly sized. That is, the node 804*b* can be considered as the resized version of the node 804*a* based on the level of importance of the node 804*a*; the node 806*b* can be considered as the resized version of the node 806*a* based on the level of importance of the node 806*a*; the node 808*b* can be considered as the resized version of the node 808*a* based on the level of importance of the node 808*a*; the node 810*b* can be considered as the resized version of the node 810*a* based on the level of importance of the node 810*a*; the node 812*b* can be considered as the resized version of the node 812*a* based on the level of importance of the node 812*a*; the node 814*b* can be considered as the resized version of the node 814*a* based on the level of importance of the node 814*a*; and the node 816*b* can be considered as the resized version of the node 816*a* based on the level of importance of the node 816*a*.

In various cases, the larger a node appears in the transaction community 802, the higher that node's level of importance. Conversely, the smaller a node appears in the transaction community 802, the lower that node's level of importance. As shown in the non-limiting example of FIG. 8, the node 808*b* can be the largest node, which can mean that the node 808*b* (and thus the node 808*a*) is the most important in the transaction community 802 (in the transaction community 606). Likewise, as shown, the node 810*b* can be the second largest node, which can mean that the node 810*b* (and thus the node 810*a*) is the second most important in the transaction community 802 (in the transaction community 606). Similarly, as shown, the nodes 804*b*, 806*b*, 812*b*, and 814*b* can be the smallest nodes, which can mean that those nodes are the least important in the transaction community 802.

As explained above, the importance-assignment algorithm 702 can estimate the level of importance of a particular node based on the number of edges of the particular node, based on the weights of the edges of the particular node, and/or based on the estimated levels of importance of other nodes that are coupled to the particular node. Accordingly, nodes that have more numerous edges and/or more heavily-weighted edges can be considered as more important than nodes that have less numerous edges and/or less heavily-weighted edges. Similarly, nodes that are coupled to more important nodes can themselves be considered as more important. In the non-limiting example shown in FIG. 8, the nodes 808*b*, 810*b*, and 816*b* have the most edges, which can cause them to be more important. In contrast, as shown, the nodes 804*b*, 806*b*, 812*b*, and/or 814*b* have the fewest edges, which can cause them to be less important. Those having ordinary skill in the art will appreciate that different nodes having the same number of edges can have different levels of importance, based on the respective weights of those edges and/or based on the levels of importance of the nodes to which those edges are coupled.

In any case, the ranking component 120 can electronically execute the importance-assignment algorithm 702 on each of the transaction communities in the set of transaction communities 504, which can cause the ranking component 120 to compute a level of importance for each node in the transaction graph 202. Such levels of importance can be considered as the set of importance levels 704.

Figure 9:
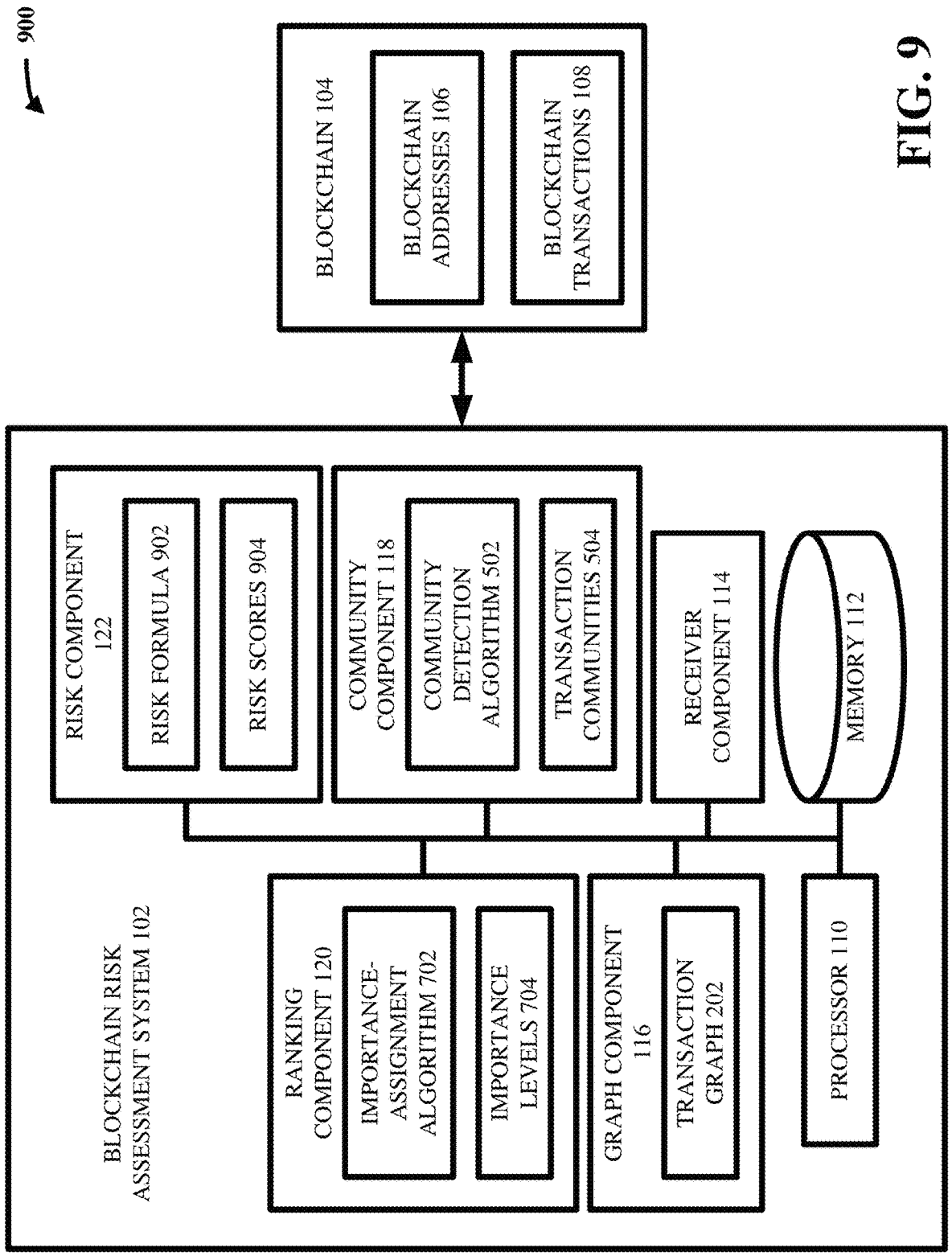
FIG. 9 illustrates a high-level block diagram of an example, non-limiting system including a risk formula and risk scores that facilitates blockchain address risk assessment via graph analysis in accordance with one or more embodiments described herein.

FIG. 9 illustrates a high-level block diagram of an example, non-limiting system 900 including a risk formula and risk scores that can facilitate blockchain address risk assessment via graph analysis in accordance with one or more embodiments described herein. As shown, the system 900 can, in some cases, comprise the same components as the system 700, and can further comprise a risk formula 902 and/or a set of risk scores 904.

In various embodiments, the risk component 122 can use the risk formula 902 to electronically compute the set of risk scores 904. In various cases, the set of risk scores 904 can include a risk score for each node in the transaction graph 202 and thus for each of the set of blockchain addresses 106. In various instances, a risk score can be a scalar (and/or, in some cases, a vector, a matrix, and/or a tensor) that numerically represents how risky the transactional behavior of a node, and thus of a blockchain address, appears to be.

In various cases, the risk formula 902 can be any suitable mathematical function and/or combination of mathematical functions that can take as an argument one of the set of importance levels 704 (e.g., an importance level of a given node) and that can output a corresponding one of the set of risk scores 904 (e.g., a risk score of the given node). In various aspects, the risk formula 902 can be configured to take as an argument any other suitable information, as desired. In various instances, non-limiting examples of such other information can include: number of edges pointing away from a node; number of edges pointing toward a node; size of a transaction community to which a node belongs; age of a blockchain address represented by a node; number of smart contract tokens obtained by a blockchain address represented by a node; and/or a bit indicating whether a node is the most important in its transaction community.

As a non-limiting example, the risk component 122 can electronically apply the risk formula 902 to any given node in the transaction graph 202, where the risk formula 902 can be given by:

$$\text{risk score} = [\exp(a^*\text{Importance} + b^*\text{TopBit} + c^*\text{Size} + d^*\text{EdgesAway} + e^*\text{EdgesToward} + f^*\text{Age} + g^*\text{Tokens})]^{-1}$$

where: Importance is the level of importance of the given node; TopBit is a bit indicating whether the given node has the highest level of importance in its transaction community (e.g., TopBit=1 if the given node has the highest level of importance in its transaction community; TopBit=0 if the given node does not have the highest level of importance in its transaction community); Size is the total number of nodes that belong to the transaction community of the given node; EdgesAway is the number of edges that point away from the given node; EdgesToward is the number of edges that point toward the given node; Age is the amount of time since the creation and/or registration of the blockchain address that is represented by the given node; Tokens is the number of smart contract coins owned by the blockchain address that is represented by the given node; and a, b, c, d, e, f, and g are configurable coefficients, parameters, and/or weights having any suitable real values. In other words, the risk formula 902 can, in various aspects, be equal to and/or otherwise based on a reciprocal exponential of a weighted linear combination of the level of importance of an inputted node, a bit indicating whether the inputted node is the most important in its transaction community, a size of the transaction community of the inputted node, a number of edges leaving the inputted node, a number of edges entering the inputted node, an age of the blockchain address corresponding to the inputted node, and/or a number of tokens held by the blockchain address corresponding to the inputted node. Those having ordinary skill in the art will appreciate that the above specific formula is a mere non-limiting example. In various aspects, the risk formula 902 can take any other suitable form and/or can include any other suitable mathematical functions, as desired (e.g., the risk formula 902 can take as input any suitable subset of the above-mentioned possible arguments).

In any case, the risk component 122 can electronically compute the set of risk scores 904 by using the risk formula 902, where the set of risk scores 904 can include a risk score for each blockchain address in the set of blockchain addresses 106. In various aspects, the risk component 122 can electronically transmit the set of risk scores 904 to any suitable database (not shown) and/or computing device (not shown), as desired. In various instances, the risk component 122 can electronically generate a report and/or summary of the set of risk scores 904 and can electronically transmit such report/summary to any suitable database (not shown) and/or computing device (not shown), as desired.

Figure 10:
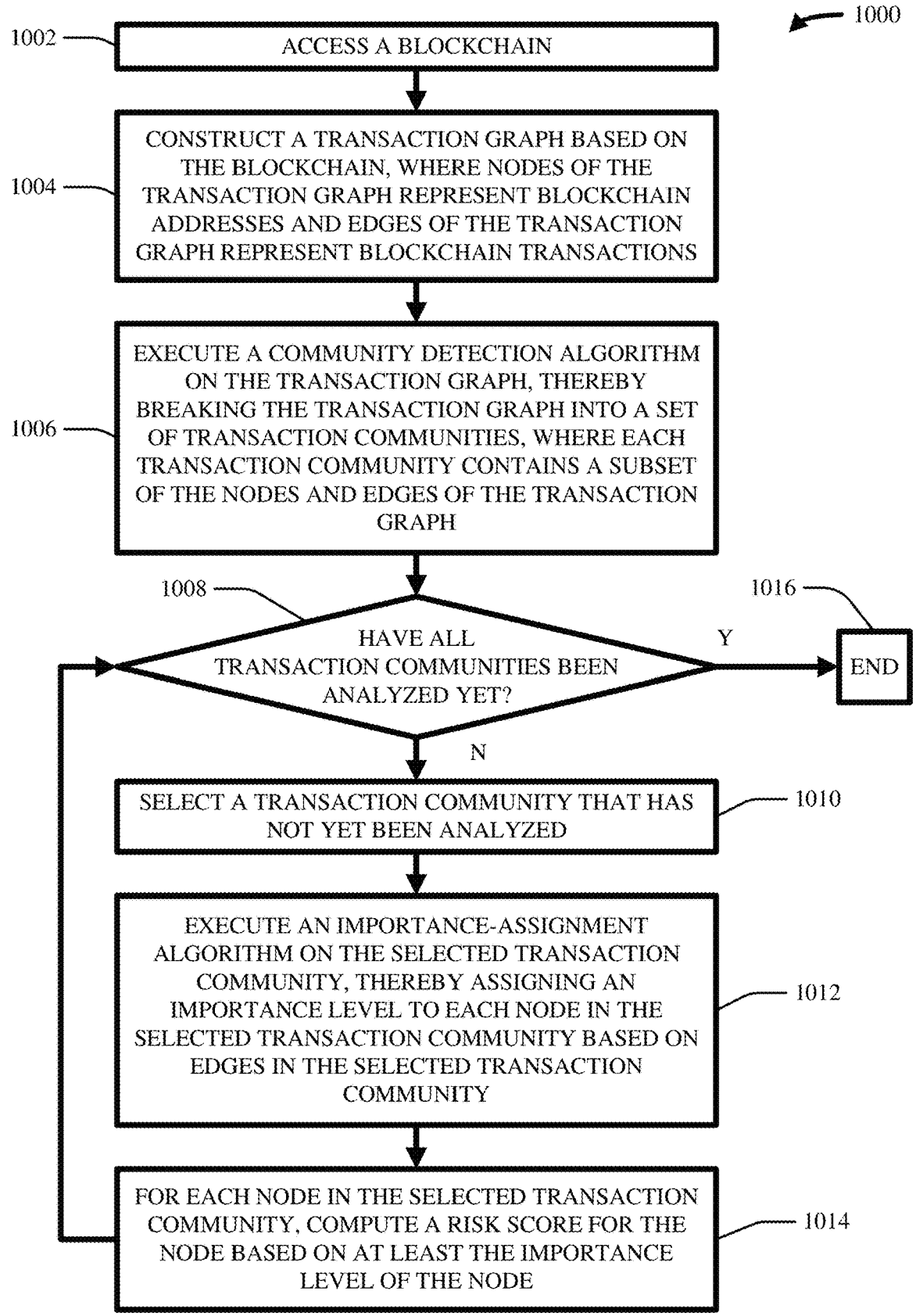
FIG. 10 illustrates a high-level flow diagram of an example, non-limiting computer-implemented method that facilitates blockchain address risk assessment via graph analysis in accordance with one or more embodiments described herein.

FIG. 10 illustrates a high-level flow diagram of an example, non-limiting computer-implemented method 1000 that can facilitate blockchain address risk assessment via graph analysis in accordance with one or more embodiments described herein. In various cases, the computer-implemented method 1000 can be facilitated by the blockchain risk assessment system 102.

In various embodiments, act 1002 can include accessing, by a computer system (e.g., 114), a blockchain (e.g., 104). That is, the computer system can, in various cases, electronically interact with the blockchain in any suitable fashion so as to read information contained within the blockchain.

In various aspects, act 1004 can include constructing, by the computer system (e.g., 116), a transaction graph (e.g., 202) based on the blockchain. In various cases, nodes of the transaction graph can represent blockchain addresses that are recorded and/or documented in the blockchain. In various cases, edges of the transaction graph can represent blockchain transactions that are recorded and/or documented in the blockchain.

In various instances, act 1006 can include executing, by the computer system (e.g., 118), a community detection algorithm (e.g., 502) on the transaction graph. In various cases, this can break the transaction graph into a set of transaction communities (e.g., 504), where each transaction community can contain any suitable subset of the nodes and/or edges of the transaction graph.

In various aspects, act 1008 can include determining, by the computer system (e.g., 120), whether all of the transaction communities have been analyzed yet by the computer system. If yes, the computer-implemented method 1000 can proceed to act 1016 where it can end. If not, the computer-implemented method 1000 can proceed to act 1010.

In various instances, act 1010 can include selecting, by the computer system (e.g., 120), a transaction community that has not yet been analyzed by the computer system. In various cases, if the computer system has not yet iterated through acts 1008-1014 of the computer-implemented method 1000, it can be the case that none of the transactions recorded in the blockchain have yet been analyzed by the computer system. In various other instances, if the computer system has already iterated through acts 1008-1014 q times for any suitable positive integer q, it can be the case that q of the transactions recorded in the blockchain have already been analyzed by the computer system.

In various aspects, act 1012 can include executing, by the computer system (e.g., 120), an importance-assignment algorithm (e.g., 702) on the selected transaction community.

In various cases, this can cause an importance level (e.g., one of 704) to be assigned to each node in the selected transaction community, based on the edges in the selected transaction community.

In various instances, act 1014 can include computing, by the computer system (e.g., 122) and for each node in the selected transaction community, a risk score (e.g., one of 904) for the node, based on at least the importance level of the node. In various cases, any other suitable information about the node can be taken into account (e.g., number of edges of the nodes, size of the transaction community of the node, bit representing whether the node is the most important in its transaction community, age of blockchain address represented by the node, and/or number of smart contract tokens owned by the blockchain address represented by the node). In various cases, the computer-implemented method 1000 can proceed back to act 1008.

Figure 11:
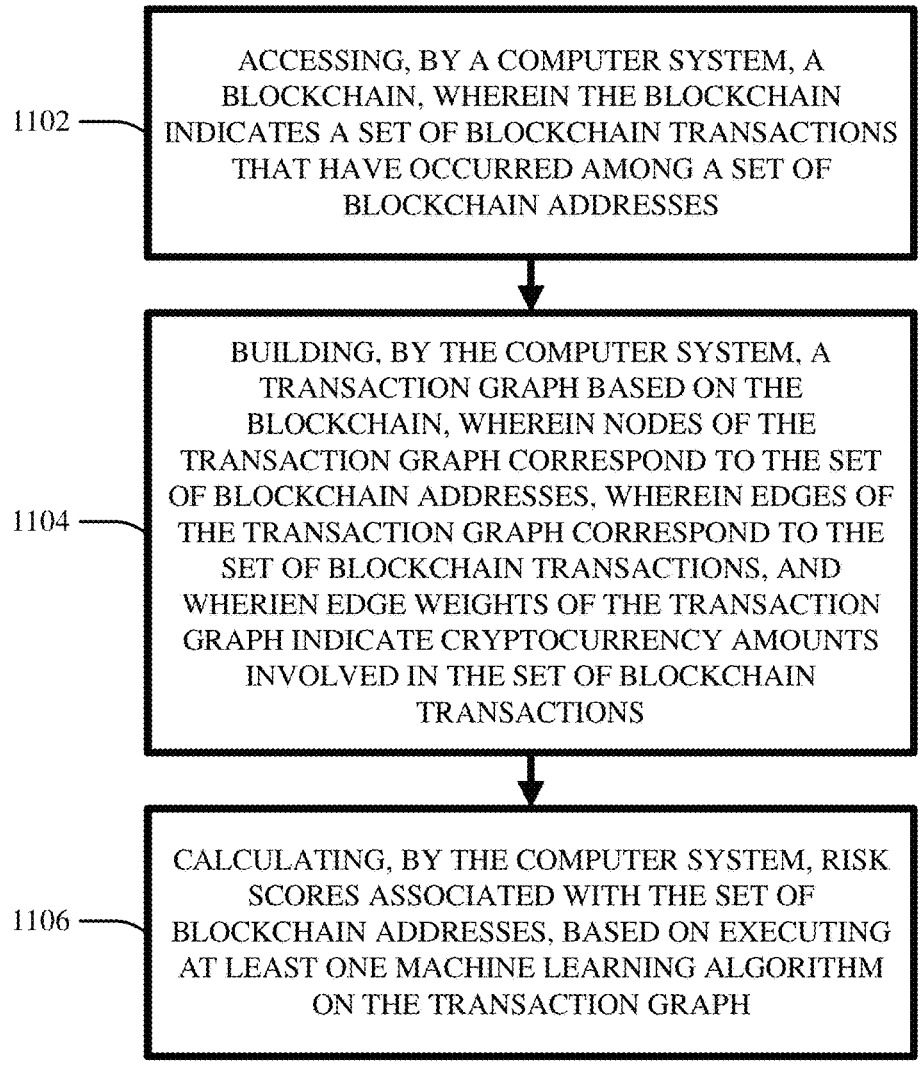
FIG. 11 illustrates a high-level flow diagram of an example, non-limiting computer-implemented method that facilitates blockchain address risk assessment via graph analysis in accordance with one or more embodiments described herein.

FIG. 11 illustrates a high-level flow diagram of an example, non-limiting computer-implemented method 1100 that can facilitate blockchain address risk assessment via graph analysis in accordance with one or more embodiments described herein. In various cases, the computer-implemented method 1100 can be facilitated by the blockchain risk assessment system 102.

In various embodiments, act 1102 can include accessing, by a computer system (e.g., 114), a blockchain (e.g., 104), wherein the blockchain can indicate a set of blockchain transactions (e.g., 108) that have occurred among a set of blockchain addresses (e.g., 106).

In various aspects, act 1104 can include building, by the computer system (e.g., 116), a transaction graph (e.g., 202) based on the blockchain. In various cases, nodes of the transaction graph can correspond to the set of blockchain addresses, edges of the transaction graph can correspond to the set of blockchain transactions, and/or edge weights of the transaction graph can indicate cryptocurrency amounts that were involved in the set of blockchain transactions.

In various instances, act 1106 can include calculating, by the computer system (e.g., 122), risk scores (e.g., 904) associated with the set of blockchain addresses, based on executing at least one machine learning algorithm (e.g., 502 and/or 702) on the transaction graph.

Although not explicitly shown in FIG. 8, the analyzing the transaction graph via the at least one machine learning algorithm can comprise: executing, by the computer system (e.g., 118), a community detection algorithm (e.g., 502) on the transaction graph, wherein the community detection algorithm is configured to identify a set of transaction communities (e.g., 504) within the transaction graph. In some cases, the set of transaction communities can be transactionally isolated from each other (e.g., no node can be coupled to a node that is from a different transaction community).

Although not explicitly shown in FIG. 8, the analyzing the transaction graph via the at least one machine learning algorithm further can comprise: executing, by the computer system (e.g., 120), an importance-assignment algorithm (e.g., 702) on a first transaction community in the set of transaction communities, wherein the importance-assignment algorithm is configured to respectively assign levels of importance (e.g., 704) to nodes that are within the first transaction community.

Although not explicitly shown in FIG. 8, the importance-assignment algorithm can assign a first level of importance to a first node that is within the first transaction community, and the calculating the risk scores can comprise: calculating a first risk score corresponding to the first node, based on the first level of importance, based on a number of edges coupled to the first node, and/or based on a size of the first transaction community. In various cases, the first level of importance, the number of edges coupled to the first node, and the size of the first transaction community can be respectively weighted by configurable parameters.

Although not explicitly shown in FIG. 8, the computer-implemented method 1100 can further comprise: transmitting, to a computing device associated with the blockchain, a risk report identifying the risk scores respectively corresponding to the blockchain addresses.

Various embodiments of the subject innovation can include a computerized tool (e.g., 102) that can electronically receive as input a blockchain (e.g., 104) and that can electronically compute as output risk scores (e.g., 904) respectively corresponding to blockchain addresses (e.g., 106) that are recorded in the blockchain. More specifically, the computerized tool can facilitate such functionality by constructing a transaction graph (e.g., 202) based on the blockchain, and by executing one or more machine learning algorithms (e.g., 502, and/or 702) on the transaction graph. In various cases, such risk scores can be used to determine whether or not to engage in transactions with various blockchain addresses (e.g., it can be desirable to avoid transacting with a blockchain address that has a high risk score). Such a computerized tool is certainly a useful and practical application of computers.

As those having ordinary skill in the art will appreciate, the community detection algorithm 502 and/or the importance-assignment algorithm 702 can incorporate any suitable machine learning techniques, as desired. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the subject innovation, and it should be further understood that, in various other embodiments of the subject innovation, it can be the case that such description applies to fewer than "each" of that particular computerized object.

Figure 12:
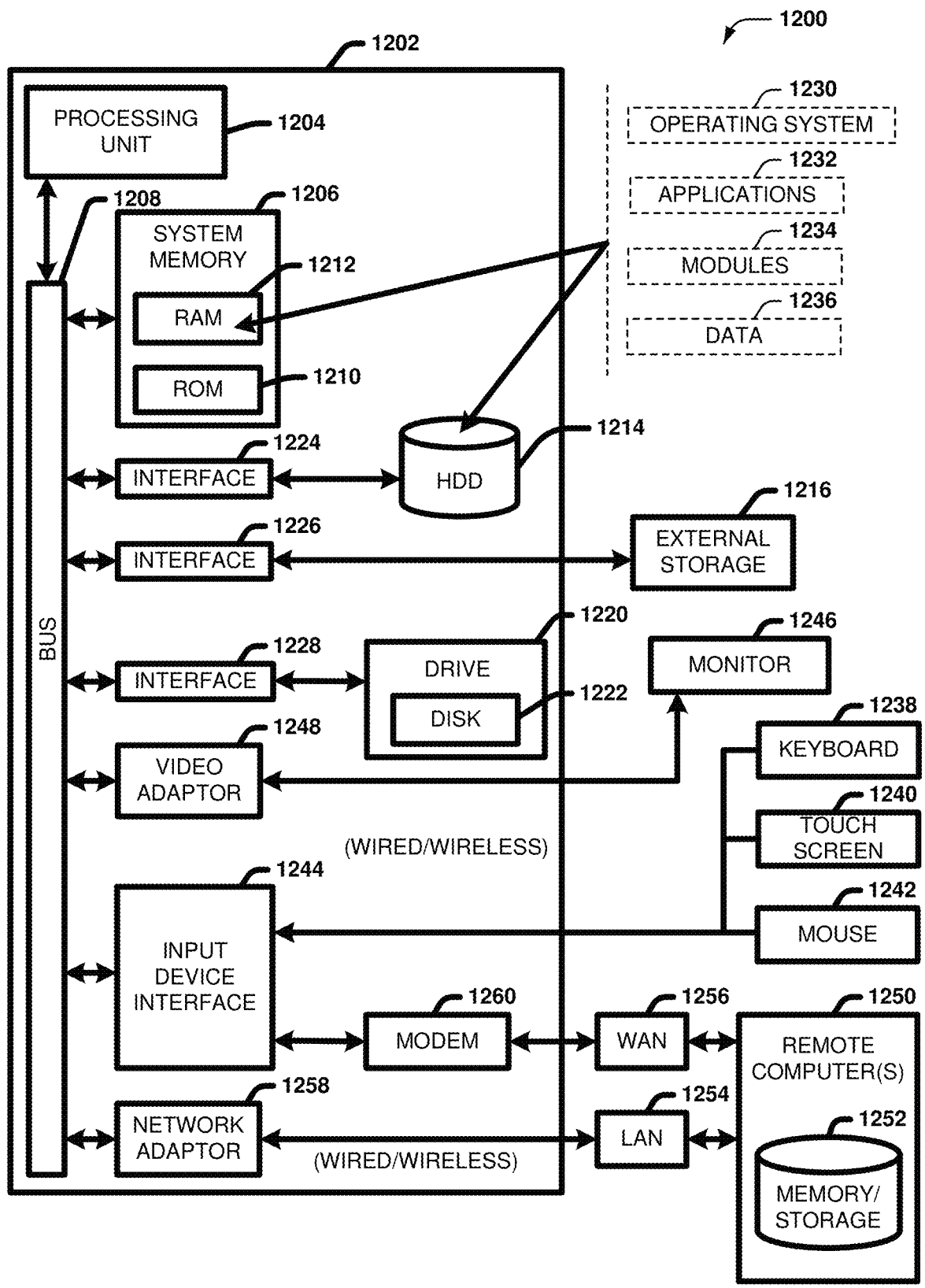
FIG. 12 illustrates a block diagram of an example, non-limiting operating environment in which one or more embodiments described herein can be facilitated.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid state drive, an optical disk drive, which can read or write from a disk 1222, such as a CD-ROM disc, a DVD, a BD, etc. Alternatively, where a solid state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
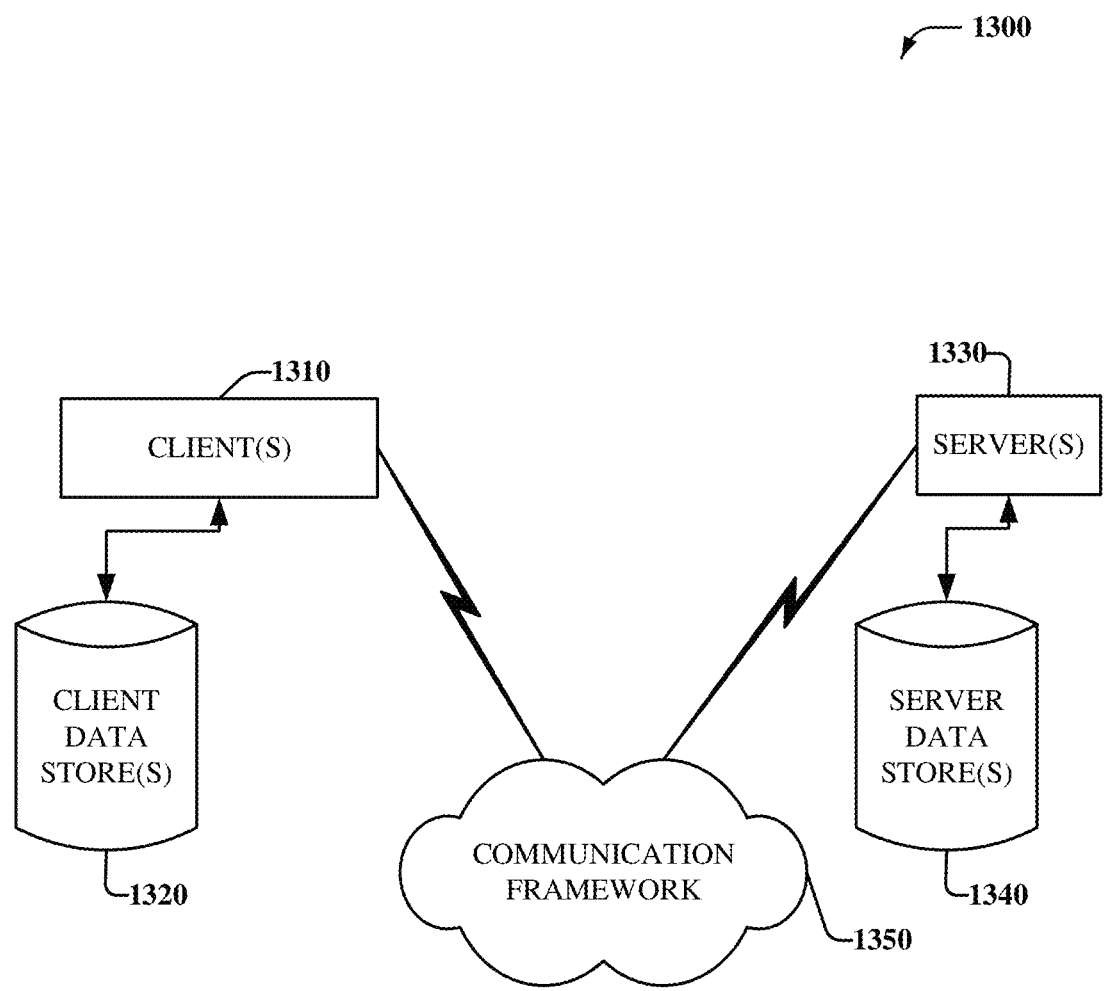
FIG. 13 illustrates an example networking environment operable to execute various implementations described herein.

FIG. 13 is a schematic block diagram of a sample computing environment 1300 with which the disclosed subject matter can interact. The sample computing environment 1300 includes one or more client(s) 1310. The client(s) 1310 can be hardware and/or software (e.g., threads, processes, computing devices). The sample computing environment 1300 also includes one or more server(s) 1330. The server(s) 1330 can also be hardware and/or software (e.g., threads, processes, computing devices). The servers 1330 can house threads to perform transformations by employing one or more embodiments as described herein, for example. One possible communication between a client 1310 and a server 1330 can be in the form of a data packet adapted to be transmitted between two or more computer processes. The sample computing environment 1300 includes a communication framework 1350 that can be employed to facilitate communications between the client(s) 1310 and the server(s) 1330. The client(s) 1310 are operably connected to one or more client data store(s) 1320 that can be employed to store information local to the client(s) 1310. Similarly, the server(s) 1330 are operably connected to one or more server data store(s) 1340 that can be employed to store information local to the servers 1330.

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others the distributed ledger represents each transaction where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser.

Implementations of the present disclosure will now be described in detail with reference to the accompanying Figures.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

Figure 14:
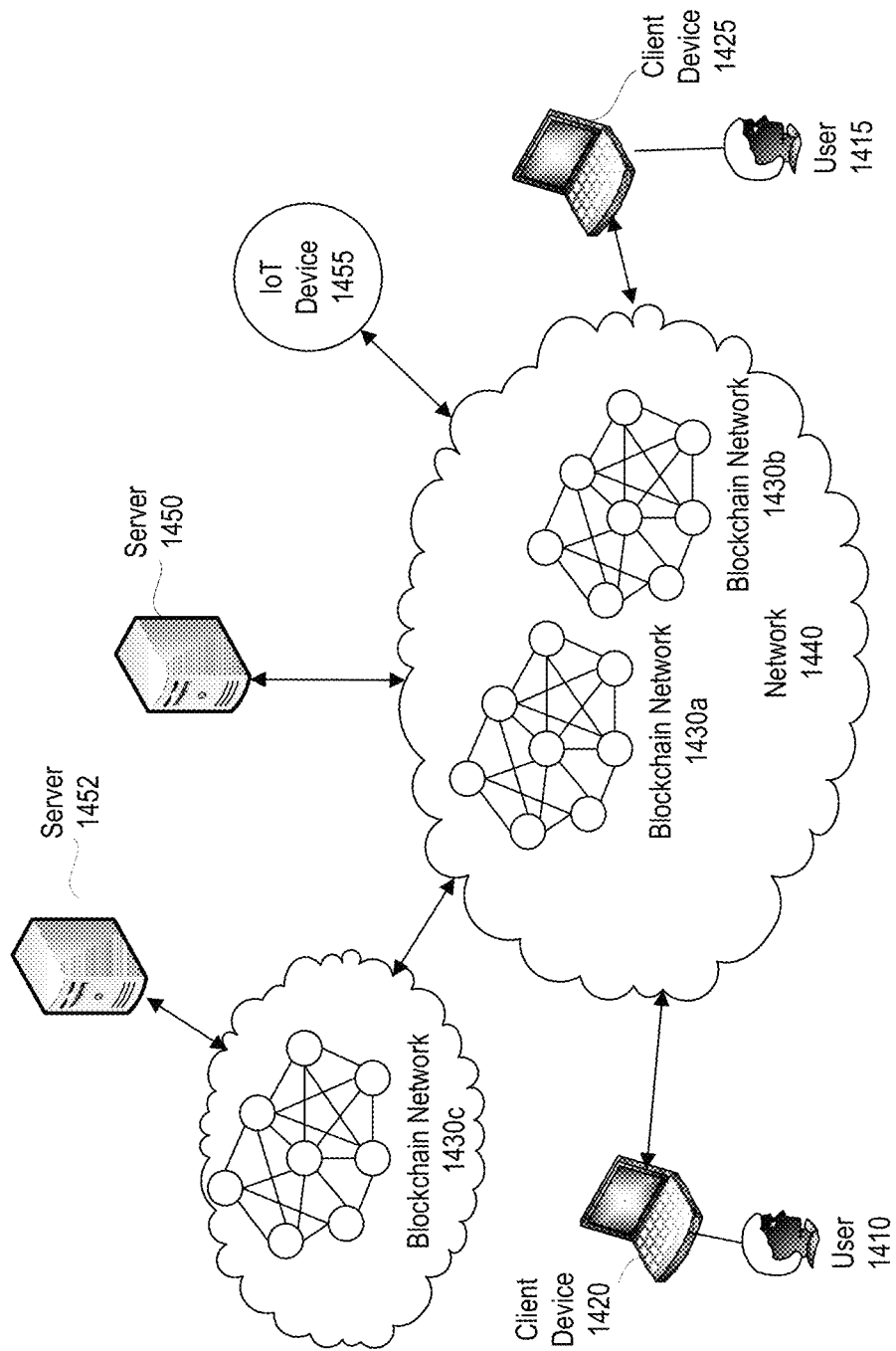
FIG. 14 illustrates an example computing architecture for facilitating one or more blockchain based transactions.

As discussed above, the distributed ledger in a blockchain framework is stored, maintained, and updated in a peer-to-peer network. In one example the distributed ledger maintains a number of blockchain transactions. FIG. 14 shows an example system 1400 for facilitating a blockchain transaction. The system 1400 includes a first client device 1420, a second client device 1425, a first server 1450, and an Internet of Things (IoT) device 1455 interconnected via a network 1440. The first client device 1420, the second client device 1425, the first server 1450 may be a computing device 1905 described in more detail with reference to FIG. 19. The IoT device 1455 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 1440 may be any of a variety of available networks, such as the Internet, and represents a worldwide collection of networks and gateways to support communications between devices connected to the network 1440. The system 1400 may also comprise one or more distributed or peer-to-peer (P2P) networks, such as a first, second, and third blockchain network 1430*a-c* (generally referred to as blockchain networks 1430). As shown in FIG. 14, the network 1440 may comprise the first and second blockchain networks 1430*a* and 1430*b*. The third blockchain network 1430*c* may be associated with a private blockchain as described below with reference to FIG. 15, and is thus, shown separately from the first and second blockchain networks 1430*a* and 1430*b*. Each blockchain network 1430 may comprise a plurality of interconnected devices (or nodes) as described in more detail with reference to FIG. 15. As discussed above, a ledger, or blockchain, is a distributed database for maintaining a growing list of records comprising any type of information. A blockchain, as described in more detail with reference to FIG. 16, may be stored at least at multiple nodes (or devices) of the one or more blockchain networks 1430.

In one example, a blockchain based transaction may generally involve a transfer of data or value between entities, such as the first user 1410 of the first client device 1420 and the second user 1415 of the second client device 1425 in FIG. 14. The server 1450 may include one or more applications, for example, a transaction application configured to facilitate the transaction between the entities by utilizing a blockchain associated with one of the blockchain networks 1430. As an example, the first user 1410 may request or initiate a transaction with the second user 1415 via a user application executing on the first client device 1420. The transaction may be related to a transfer of value or data from the first user 1410 to the second user 1415. The first client device 1420 may send a request of the transaction to the server 1450. The server 1450 may send the requested transaction to one of the blockchain networks 1430 to be validated and approved as discussed below.

Blockchain Network

Figure 15:
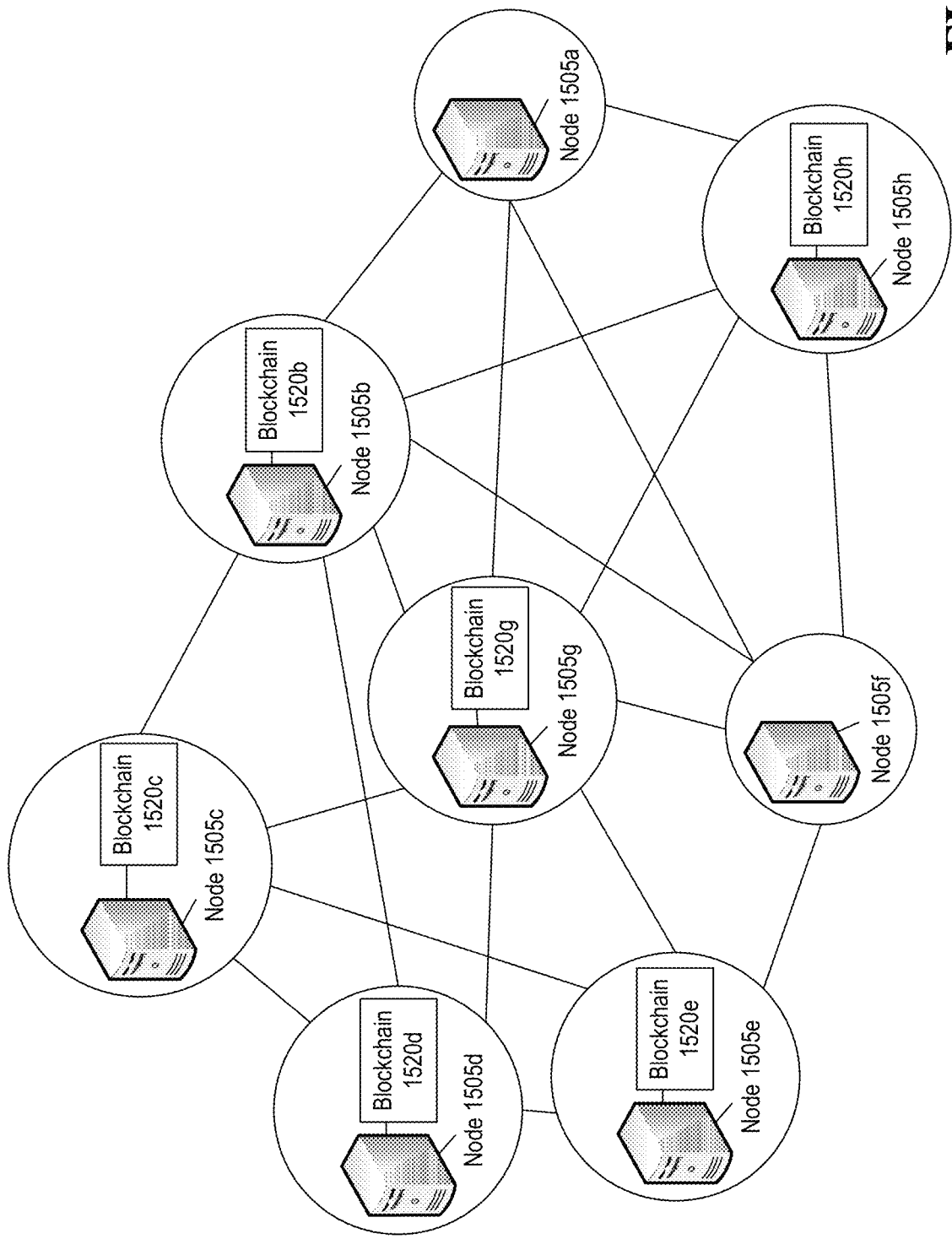
FIG. 15 illustrates an example blockchain network.
Figure 16:
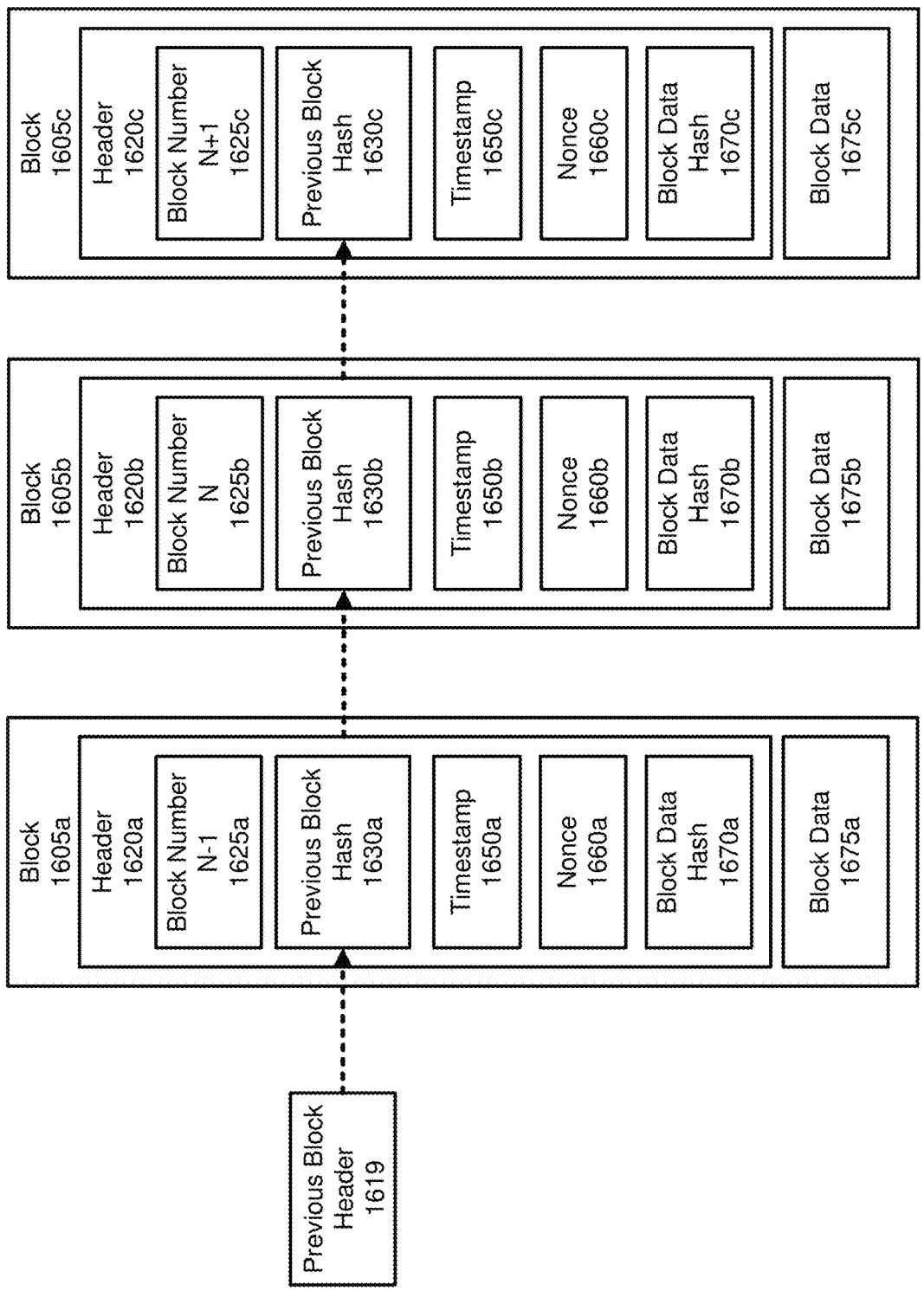
FIG. 16 illustrates an example blockchain.

FIG. 15 shows an example blockchain network 1500 comprising a plurality of interconnected nodes or devices 1505*a-h* (generally referred to as nodes 1505). Each of the nodes 1505 may comprise a computing device 1905 described in more detail with reference to FIG. 19. Although FIG. 15 shows a single device 1505, each of the nodes 1505 may comprise a plurality of devices (e.g., a pool). The blockchain network 1500 may be associated with a blockchain 1520. Some or all of the nodes 1505 may replicate and save an identical copy of the blockchain 1520. For example, FIG. 16 shows that the nodes 1505*b-e* and 1505*g-h* store copies of the blockchain 1520. The nodes 1505*b-e* and 1505*g-h* may independently update their respective copies of the blockchain 1520 as discussed below.

Blockchain Node Types

Blockchain nodes, for example, the nodes 1505, may be full nodes or lightweight nodes. Full nodes, such as the nodes 1505*b-e* and 1505*g-h*, may act as a server in the blockchain network 1500 by storing a copy of the entire blockchain 1520 and ensuring that transactions posted to the blockchain 1520 are valid. The full nodes 1505*b-e* and 1505*g-h* may publish new blocks on the blockchain 1520. Lightweight nodes, such as the nodes 1505*a* and 1505*f*, may have fewer computing resources than full nodes. For example, IoT devices often act as lightweight nodes. The lightweight nodes may communicate with other nodes 1505, provide the full nodes 1505*b-e* and 1505*g-h* with information, and query the status of a block of the blockchain 1520 stored by the full nodes 1505b-e and 1505g-h. In this example, however, as shown in FIG. 15, the lightweight nodes 1505a and 1505f may not store a copy of the blockchain 1520 and thus, may not publish new blocks on the blockchain 1520.

Blockchain Network Types

The blockchain network 1500 and its associated blockchain 1520 may be public (permissionless), federated or consortium, or private. If the blockchain network 1500 is public, then any entity may read and write to the associated blockchain 1520. However, the blockchain network 1500 and its associated blockchain 1520 may be federated or consortium if controlled by a single entity or organization. Further, any of the nodes 1505 with access to the Internet may be restricted from participating in the verification of transactions on the blockchain 1520. The blockchain network 1500 and its associated blockchain 1520 may be private (permissioned) if access to the blockchain network 1500 and the blockchain 1520 is restricted to specific authorized entities, for example organizations or groups of individuals. Moreover, read permissions for the blockchain 1520 may be public or restricted while write permissions may be restricted to a controlling or authorized entity.

Blockchain

As discussed above, a blockchain 1520 may be associated with a blockchain network 1500. FIG. 16 shows an example blockchain 1600. The blockchain 1600 may comprise a plurality of blocks 1605a, 1605b, and 1605c (generally referred to as blocks 1605). The blockchain 1600 comprises a first block (not shown), sometimes referred to as the genesis block. Each of the blocks 1605 may comprise a record of one or a plurality of submitted and validated transactions. The blocks 1605 of the blockchain 1600 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 1600 may be stored locally, in the cloud, on grid, for example by the nodes 1505b-e and 1505g-h, as a file or in a database.

Blocks

Each of the blocks 1605 may comprise one or more data fields. The organization of the blocks 1605 within the blockchain 1600 and the corresponding data fields may be implementation specific. As an example, the blocks 1605 may comprise a respective header 1620a, 1620b, and 1620c (generally referred to as headers 1620) and block data 1675a, 1675b, and 1675c (generally referred to as block data 1675). The headers 1620 may comprise metadata associated with their respective blocks 1605. For example, the headers 1620 may comprise a respective block number 1625a, 1625b, and 1625c. As shown in FIG. 16, the block number 1625a of the block 1605a is N−1, the block number 1625b of the block 1605b is N, and the block number 1625c of the block 1605c is N+1. The headers 1620 of the blocks 1605 may include a data field comprising a block size (not shown).

The blocks 1605 may be linked together and cryptographically secured. For example, the header 1620b of the block N (block 1605b) includes a data field (previous block hash 1630b) comprising a hash representation of the previous block N−1's header 1620a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 1620c of the block N+1 (block 1605c) includes a data field (previous block hash 1630c) comprising a hash representation of block N's (block 1605b) header 1620b.

The headers 1620 of the blocks 1605 may also include data fields comprising a hash representation of the block data, such as the block data hash 1670a-c. The block data hash 1670a-c may be generated, for example, by a Merkle tree and by storing the hash or by using a hash that is based on all of the block data. The headers 1620 of the blocks 1605 may comprise a respective nonce 1660a, 1660b, and 1660c. In some implementations, the value of the nonce 1660a-c is an arbitrary string that is concatenated with (or appended to) the hash of the block. The headers 1620 may comprise other data, such as a difficulty target.

The blocks 1605 may comprise a respective block data 1675a, 1675b, and 1675c (generally referred to as block data 1675). The block data 1675 may comprise a record of validated transactions that have also been integrated into the blockchain 1500 via a consensus model (described below). As discussed above, the block data 1675 may include a variety of different types of data in addition to validated transactions. Block data 1675 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 14, the server 1450 may include one or more applications, for example, a transaction application configured to facilitate a blockchain transaction between entities. The entities may include users, devices, etc. The first user 1410 may request or initiate a transaction with the second user 1415 via a user application executing on the first client device 1420. The transaction may be related to a transfer of value or data from the first user 1410 to the second user 1415. The value or data may represent money, a contract, property, records, rights, status, supply, demand, alarm, trigger, or any other asset that may be represented in digital form. The transaction may represent an interaction between the first user 1410 and the second user 1415.

Figure 17:
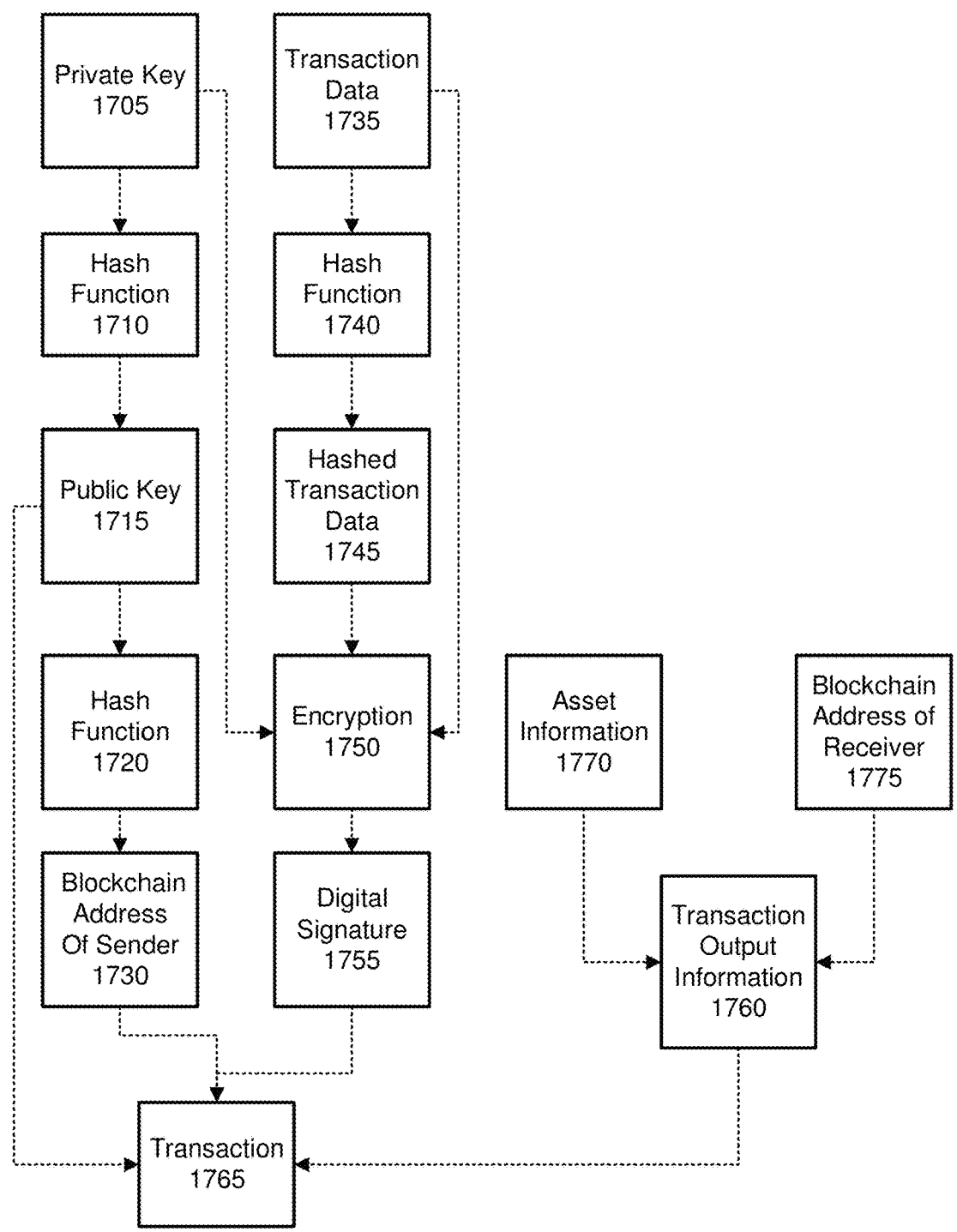
FIG. 17 is a diagram of an example transaction message.

FIG. 17 is a diagram of a transaction 1765 generated by the transaction application. The transaction 1765 may include a public key 1715, a blockchain address 1730 associated with the first user 1410, a digital signature 1755, and transaction output information 1760. The transaction application may derive a public key 1715 from a private key 1705 of the first user 1410 by applying a cryptographic hash function 1710 to the private key 1705. The cryptographic hash function 1710 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 1410, such as the blockchain address 1730, by applying a hash function 1720 to the public key 1715. Briefly, a hash function is a function that may be used for mapping arbitrary size data to fixed size data. The value may also be referred to as a digest, a hash value, a hash code, or a hash. In order to indicate that the first user 1410 is the originator of the transaction 1765, the transaction application may generate the digital signature 1755 for the transaction data 1735 using the private key 1705 of the first user 1410. The transaction data 1735 may include information about the assets to be transferred and a reference to the sources of the assets, such as previous transactions in which the assets were transferred to the first user 1410 or an identification of events that originated the assets. Generating the digital signature 1755 may include applying a hash function 1740 to the transaction data 1735 resulting in hashed transaction data 1745. The hashed transaction data 1745 and the transaction data 1735 may be encrypted (via an encryption function 1750) using the private key 1705 of the first user 1410 resulting in the digital signature 1755. The transaction output information 1760 may include asset information 1770 and an address or identifier for the second user 1750, such as the blockchain address 1775. The transaction 1765 may be sent from the first client device 1425 to the server 1450.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 1410, shown in FIG. 17 as the blockchain address of sender 1730, may include an alphanumeric string of characters derived from the public key 1715 of the first user 1410 based on applying a cryptographic hash function 1720 to the public key 1715. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 18:
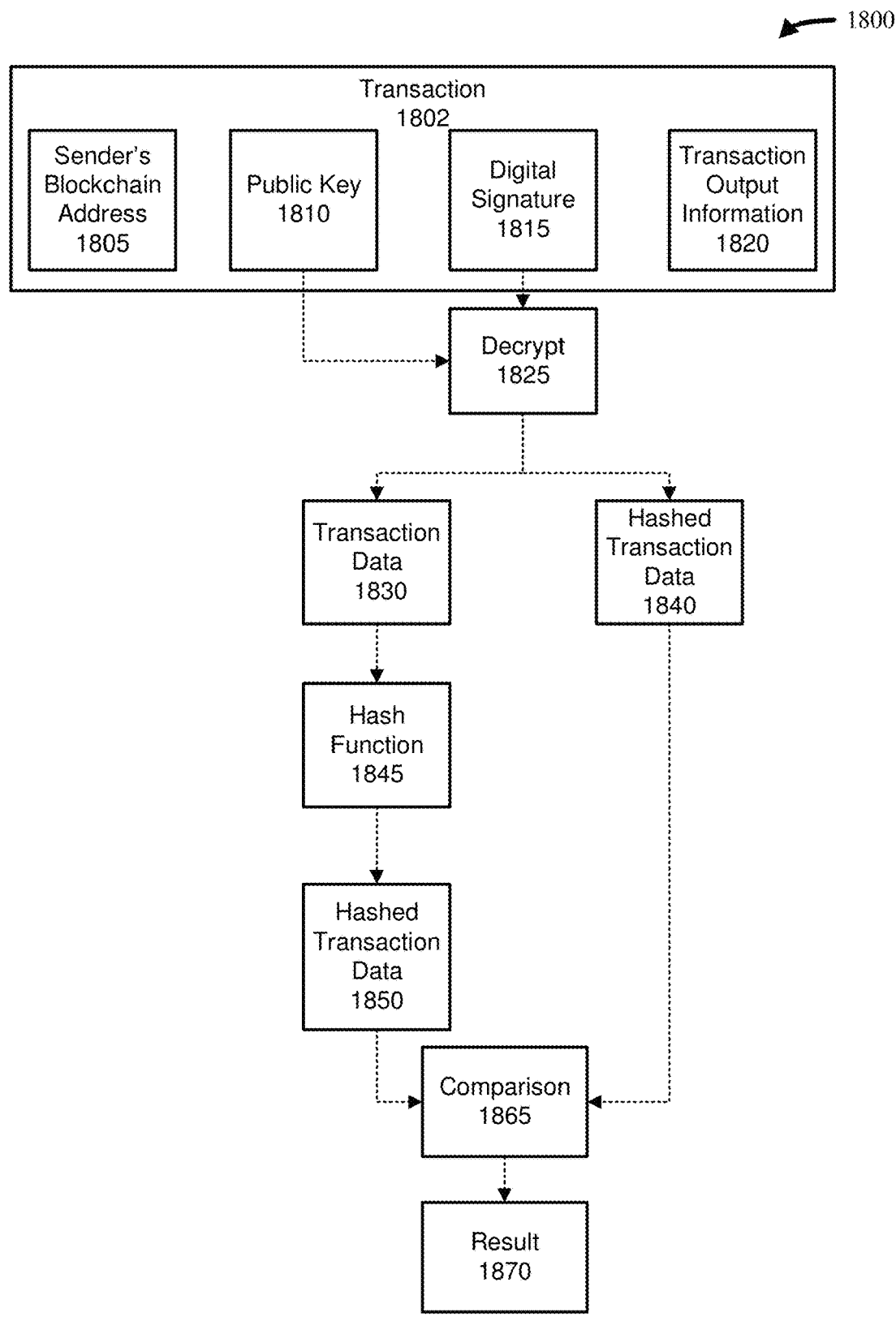
FIG. 18 shows an example transaction broadcast the blockchain network.

The server 1450 may receive transactions from users of the blockchain network 1430. The transactions may be submitted to the server 1450 via desktop applications, smartphone applications, digital wallet applications, web services, or other software applications. The server 1450 may send or broadcast the transactions to the blockchain network 1430. FIG. 18 shows an example transaction 1802 broadcast by the server 1450 to the blockchain network 1430. The transaction 1802 may be broadcast to multiple nodes 1505 of the blockchain network 1430. Typically, once the transaction 1802 is broadcast or submitted to the blockchain network 1430, it may be received by one or more of the nodes 1505. Once the transaction 1802 is received by the one or more nodes 1505 of the blockchain network 1430, it may be propagated by the receiving nodes 1505 to other nodes 1505 of the blockchain network 1430.

A blockchain network may operate according to a set of rules. The rules may specify conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcast to one or more specific nodes based on criteria related to the node's geography, history, reputation, market conditions, docket/delay, technology platform. The rules may be dynamically modified or updated (e.g. turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 1505 may receive the broadcasted transaction 1802 at the same time, due to issues such as latency. Additionally, not all of the full nodes 1505 that receive the broadcasted transaction 1802 may choose to validate the transaction 1802. A node 1505 may choose to validate specific transactions, for example, based on transaction fees associated with the transaction 1802. The transaction 1802 may include a blockchain address 1805 for the sender, a public key 1810, a digital signature 1815, and transaction output information 1820. The node 1505 may verify whether the transaction 1802 is legal or conforms to a pre-defined set of rules. The node 1505 may also validate the transaction 1802 based on establishing user authenticity and transaction data integrity. User authenticity may be established by determining whether the sender indicated by the transaction 1802 is in fact the actual originator of the transaction 1802. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 1802 may be established by determining whether the data associated with the transaction 1802 was modified in any way. Referring back to FIG. 17, when the transaction application creates the transaction 1765, it may indicate that the first user 1410 is the originator of the transaction 1765 by including the digital signature 1755.

The node 1505 may decrypt the digital signature 1815 using the public key 1810. A result of the decryption may include hashed transaction data 1840 and transaction data 1830. The node 1505 may generate hashed transaction data 1850 based on applying a hash function 1845 to the transaction data 1830. The node 1505 may perform a comparison 1865 between the first hashed transaction data 1840 and the second hashed transaction data 1850. If the result 1870 of the comparison 1865 indicates a match, then the data integrity of the transaction 1802 may be established and node 1505 may indicate that the transaction 1802 has been successfully validated. Otherwise, the data of the transaction 1802 may have been modified in some manner and the node 1505 may indicate that the transaction 1802 has not been successfully validated.

Each full node 1505 may build its own block and add validated transactions to that block. Thus, the blocks of different full nodes 1505 may comprise different validated transactions. As an example, a full node 1505a may create a first block comprising transactions "A," "B," and "C." Another full node 1505b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a set of rules that are encoded in a smart contract. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 1505 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 1505 solves the puzzle, it may publish its block to be validated by the validation nodes 1505 of the blockchain network 1430.

In a proof of work consensus model, a node validates a transaction, for example, by running a check or search through the current ledger stored in the blockchain. The node will create a new block for the blockchain that will include the data for one or more validated transactions (see, e.g., block 1675 of FIG. 16). In a blockchain implementation such as Bitcoin, the size of a block is constrained. Referring back to FIG. 16, in this example, the block will include a Previous Block Hash 1630 representing a hash of what is currently the last block in the blockchain. The block may also include a hash 1670 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 1660. Because final hash values cannot be predicted based on its input, it is not possible to estimate an appropriate value for the nonce 1660 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the block chain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue it causes a delay in completing the transaction. Reducing the time to complete a transaction may be important. A set of blockchain rules, or renumeration/compensation for a node to process the returned transaction may determine how a returned transaction is to treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 1505 publishes a next block to the blockchain. In a permissionless blockchain network, the nodes 1505 may compete to determine which one publishes the next block. A node 1505 may be selected to publish its block as the next block in the blockchain based on consensus model. For example, the selected or winning node 1505 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g, the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive that the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g. in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcast to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Blockchain Based Application: Cryptocurrency

Cryptocurrency is a medium of exchange that may be created and stored electronically in a blockchain, such as a the blockchain 1430a in FIG. 14. Bitcoin is one example of cryptocurrency, however there are several other cryptocurrencies. Various encryption techniques may be used for creating the units of cryptocurrency and verifying transactions. As an example, the first user 1410 may own 10 units of a cryptocurrency. The blockchain 1430a may include a record indicating that the first user 1410 owns the 10 units of cryptocurrency. The first user 1410 may initiate a transfer of the 10 units of cryptocurrency to the second user 1415 via a wallet application executing on the first client device 1420. The wallet application may store and manage a private key of the first user 1410. Examples of the wallet device include a personal computer, a laptop computer, a smartphone, a personal data assistant (PDA), etc.

Figure 19A:
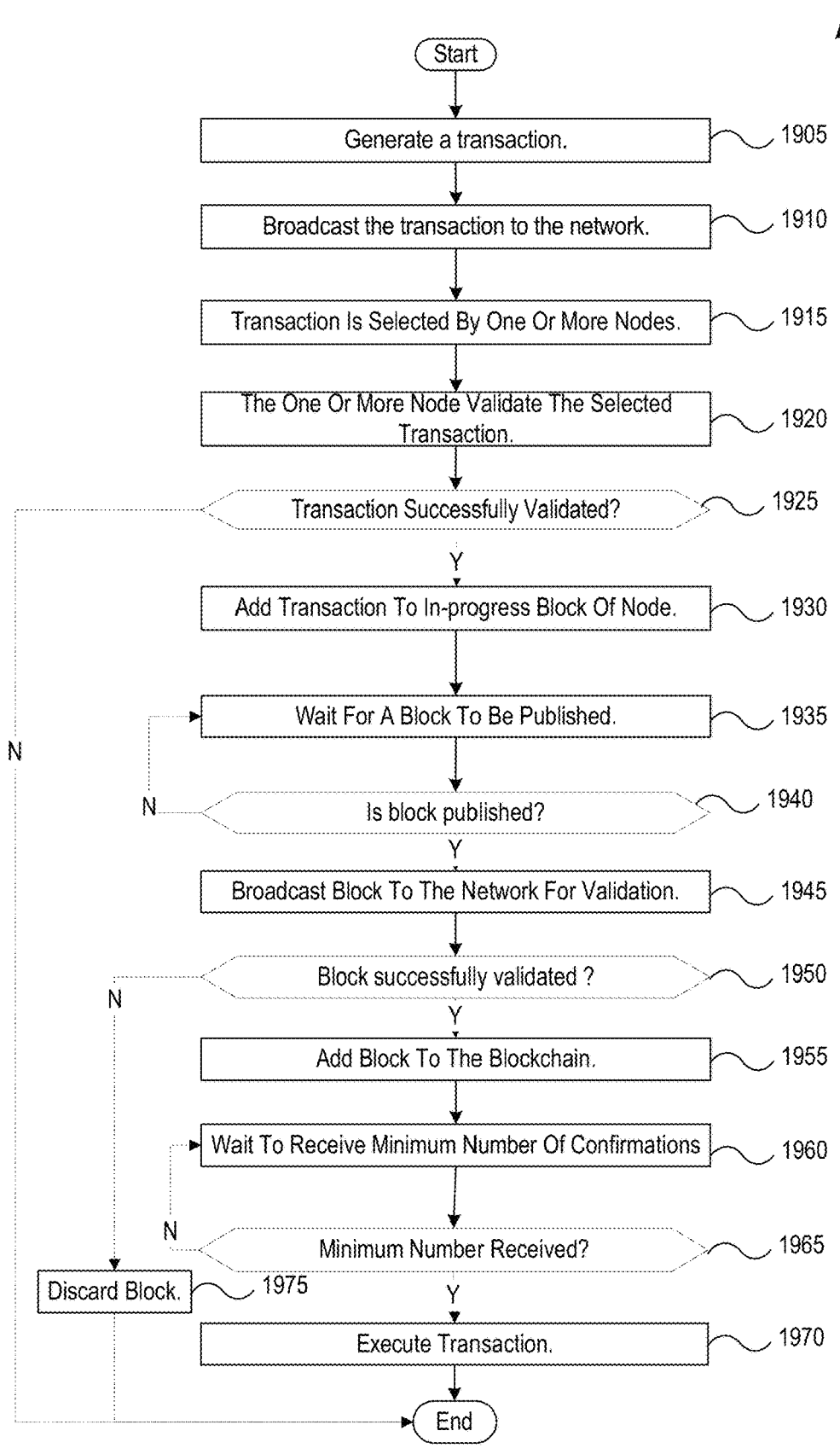
FIG. 19A is a flow diagram showing steps of an example computer-implemented method for performing a blockchain based transaction.

FIG. 19A is a flow diagram showing steps of an example method 1900 for performing a blockchain transaction between entities, such as the first user 1410 of the first client device 1420 and the second user 1415 of the second client device 1425 in FIG. 14. The steps of the method 1900 may be performed by any of the computing devices shown in FIG. 14. Alternatively or additionally, some or all of the steps of the method 1900 may be performed by one or more other computing devices. Steps of the method 1900 may be modified, omitted, and/or performed in other orders, and/or other steps added.

At step 1905, the wallet application may generate transaction data for transferring the 10 units of cryptocurrency from the first user 1410 to the second user 1420. The wallet application may generate a public key for the transaction using the private key of the first user 1410. In order to indicate that the first user 1410 is the originator of the transaction, a digital signature may also be generated for the transaction using the private key of the first user 1410. As discussed with reference to FIG. 17, the transaction data may include information, such as a blockchain address of the sender 1730, the digital signature 1755, transaction output information 1760, and the public key of the sender 1715. The transaction data may be sent to the server 1450 from the first client device 1425.

The server 1450 may receive the transaction data from the first client device 1425. At step 1910, the server 1450 may broadcast the transaction to the blockchain network 1430a. The transaction may be received by one or more nodes 1505 of the blockchain network 1430a. At step 1915, upon receiving the transaction, a node 1505 may choose to validate the transaction, for example, based on transaction fees associated with the transaction. If the transaction is not selected for validation by any of the nodes 1505, then the transaction may be placed in a queue and wait to be selected by a node 1505.

At step 1920, each of the nodes 1505 that selected the transaction may validate the transaction. Validating the transaction may include determining whether the transaction is legal or conforms to a pre-defined set of rules for that transaction, establishing user authenticity, and establishing transaction data integrity. At step 1925, if the transaction is successfully validated by a node 1505, the validated transaction is added to a block being constructed by that node 1505. As discussed above, since different nodes 1505 may choose to validate different transactions, different nodes 1505 may build or assemble a block comprising different validated transactions. Thus, the transaction associated with the first user 1410 transferring 10 units of cryptocurrency to the second user 1415 may be included in some blocks and not others.

At step 1935, the blockchain network 1430a may wait for a block to be published. Validated transactions may be added to the block being assembled by a node 1505 until it reaches a minimum size specified by the blockchain. If the blockchain network 1430a utilizes a proof of work consensus model, then the nodes 1505 may compete for the right to add their respective blocks to the blockchain by solving a complex mathematical puzzle. The node 1505 that solves its puzzle first wins the right to publish its block. As compensation, the winning node may be awarded a transaction fee associated with the transaction (e.g., from the wallet of the first user 1410). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 1940, if a block has not been published, then the process 1900 returns to step 1935 and waits for a block to be published. However, at step 1940, if a block has been published, then the process 1900 proceeds to step 1945.

At step 1945, the published block is broadcast to the blockchain network 1430a for validation. At step 1950, if the block is validated by a majority of the nodes 1505, then at step 1955, the validated block is added to the blockchain 1520. However, at step 1950, if the block is not validated by a majority of the nodes 1505, then the process 1900 proceeds to step 1975. At step 1975, the block is discarded and the transactions in the discarded block are returned back to the queue. The transactions in the queue may be selected by one or more nodes 1505 for the next block. The node 1505 that built the discarded block may build a new next block.

At step 1960, if the transaction was added to the blockchain 1520, the server 1450 may wait to receive a minimum number of blockchain confirmations for the transaction. At step 1965, if the minimum number of confirmations for the transaction have not been received, then the process may return to step 1960. However, if at step 1965, the minimum number of confirmations have been received, then the process proceeds to step 1970. At step 1970, the transaction may be executed and assets from the first user 1410 may be transferred to the second user 1415. For example, the 10 units of cryptocurrency owned by the first user 1410 may be transferred from a financial account of the first user 1410 to a financial account of the second user 1415 after the transaction receives at least three confirmations.

Smart Contracts

A smart contract is an agreement that is stored in a blockchain and automatically executed when the agreement's predetermined terms and conditions are met. The terms and conditions of the agreement may be visible to other users of the blockchain. When the pre-defined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first user 1410 (also referred to as tenant 1410) may rent an apartment from the second user 1415 (also referred to as landlord 1415). A smart contract may be utilized between the tenant 1410 and the landlord 1415 for payment of the rent. The smart contract may indicate that the tenant 1410 agrees to pay next month's rent of $1000 by the 28th of the current month. The agreement may also indicate that if the tenant 1410 pays the rent, then the landlord 1415 provides the tenant 1410 with an electronic receipt and a digital entry key to the apartment. The agreement may also indicate that if the tenant 1410 pays the rent by the 28th of the current month, then on the last day of the current month, both the entry key and the rent are released respectively to the tenant 1410 and the landlord 1415.

Figure 19B:
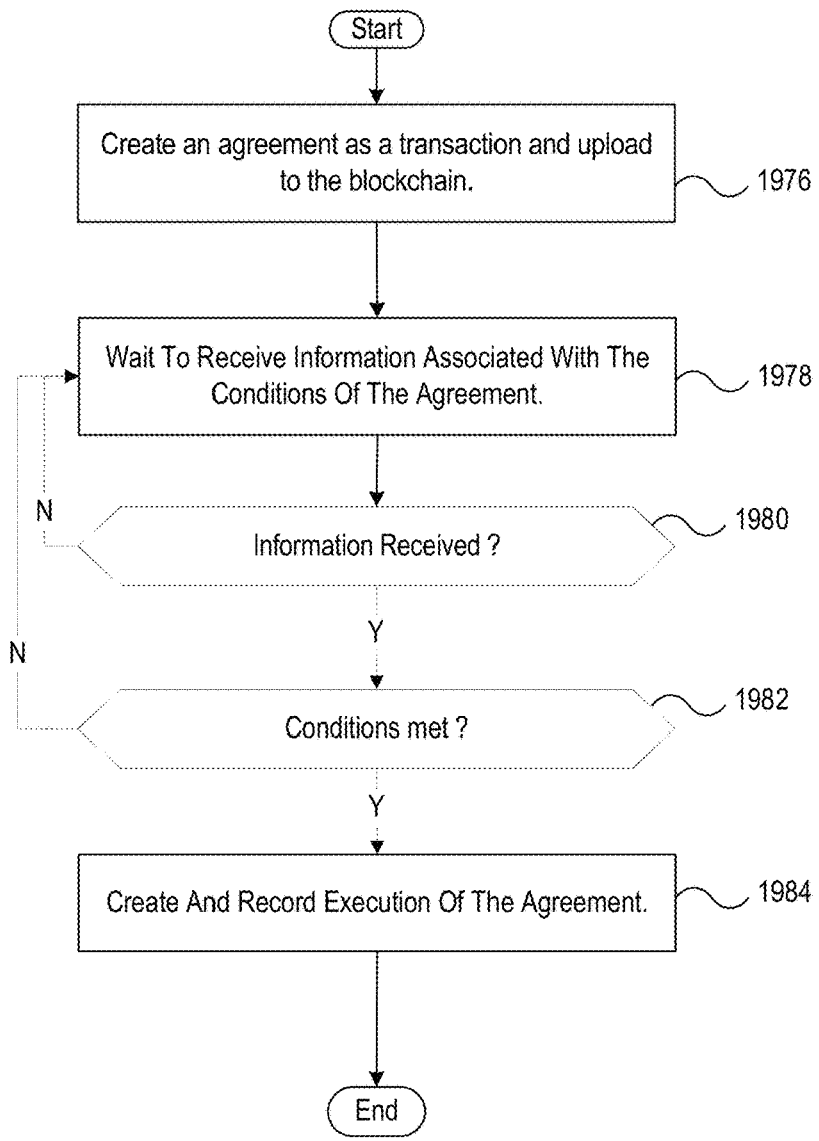
FIG. 19B is a flow diagram showing steps of an example computer-implemented method for performing a blockchain based transaction.

FIG. 19B is a flow diagram showing steps of an example method 1901 for performing a smart contract transaction between entities, such as the tenant 1410 and the landlord 1415. The steps of the method 1901 may be performed by any of the computing devices shown in FIG. 14. Alternatively or additionally, some or all of the steps of the method 1901 may be performed by one or more other computing devices. Steps of the method 1901 may be modified, omitted, and/or performed in other orders, and/or other steps added.

At step 1976, the agreement or smart contract between the tenant 1410 and the landlord 1415 may be created and then submitted to the blockchain network 1430a as a transaction. The transaction may be added to a block that is mined by the nodes 1505 of the blockchain network 1430a, the block comprising the transaction may be validated by the blockchain network 1430a and then recorded in the blockchain 1520 (as shown in steps 1910-655 in FIG. 19A). The agreement associated with the transaction may be given a unique address for identification.

At step 1978, the process 1901 waits to receive information regarding the conditions relevant for the agreement. For example, the process 1901 may wait to receive notification that $1000 was sent from a blockchain address associated with the tenant 1410 and was received at a blockchain address associated with the landlord 1415 by the 28th of the current month. At step 1980, if such a notification is not received, then the process 1901 returns to step 1978. However, if at step 1980, a notification is received, then the process 1901 proceeds to step 1982.

At step 1982, based on determining that the received notification satisfies the conditions needed to trigger execution of the various terms of the smart contract, the process 1901 proceeds to step 1984. However, at step 1982, if it is determined that the received notification does not satisfy the conditions needed to trigger execution of the smart contract, then the process 1901 returns to step 1978. At step 1984, the process 1901 creates a transaction associated with execution of the smart contract. For example, the transaction may include information of the payment received, the date the payment was received, an identification of the tenant 1410 and an identification of the landlord 1415. The transaction may be broadcast to the blockchain network 1430a and recorded in the blockchain 1520 (as shown in steps 1910-655 of the process 1900 of FIG. 19A). If the transaction is successfully recorded in the blockchain 1520, the transaction may be executed. For example, if the payment was received on the 28th, then an electronic receipt may be generated and sent to the tenant 1410. However, on the last day of the current month, both the digital entry key and the rent are released respectively to the tenant 1410 and the landlord 1415.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information or may even go out of business.

Since blockchains are immutable, amending or updating a smart contract that resides in a blockchain may be challenging and thus, more expensive and/or more restrictive than with text-based contracts.

Internet of Things (IOT)

An IoT network may include devices and sensors that collect data and relay the data to each other via a gateway. The gateway may translate between the different protocols of the devices and sensors as well as manage and process the data. IoT devices may, for example, collect information from their environments such as motions, gestures, sounds, voices, biometic data, temperature, air quality, moisture, and light. The collected information sent over the Internet for further processing. Typically, IoT devices use a low power network, Bluetooth, Wi-Fi, or satellite to connect to the Internet or "the cloud". Some IoT related issues that blockchain may be able to detect include a lack of compliance in the manufacturing stage of an IoT device. For example, a blockchain may track whether an IoT device was adequately tested.

As discussed above, information from off-chain resources, including IoT devices, may be pushed to smart contracts via third party entities known as oracles. As an example, a smart refrigerator may monitor the use of an item stored in the refrigerator, such as milk. Various sensors within the refrigerator may be utilized for periodically determining an amount of milk stored in the refrigerator. A smart contract stored in a blockchain may indicate that if the weight of the stored milk falls below 10 ounces, then a new carton of milk is automatically purchased and delivered. The refrigerator sensors may periodically send their readings to a third party service or oracle. The oracle may evaluate the sensor readings to determine whether the conditions for purchasing a new carton of milk have been met. Upon determining that the weight of the stored milk is below 10 ounces, the oracle may push information to the smart contract indicating that the condition for executing the smart contract has been met. The smart contract may execute and a new carton of milk may be automatically purchased. Both the execution of the smart contract and the purchase of the new carton may be recorded in the blockchain. In some cases, the condition may be an occurrence of an event, such as a need or anticipated need, or convenience factors, such as a delivery day, cost, promotions, or incentives.

Some issues related to the integration of blockchain into IoT include speed of transactions and computational complexity. The speed at which transactions are executed on the blockchain may be important when IoT networks with hundreds or thousands of connected devices are all functioning and transacting simultaneously. IoT devices are generally designed for connectivity rather than computation and therefore, may not have the processing power to support a blockchain consensus algorithm, such as proof of work. IoT devices also tend to be vulnerable to hacking via the Internet and/or physical tampering. For example, IoT devices may be more vulnerable to DDoS and malware attacks. Hackers may target a specific network and begin spamming the network with traffic within a short amount of time. Because of the increased surge in traffic, the bandwidth may be quickly overloaded, and the entire system may crash.

Supply Chain Monitoring and Logistics

A supply chain for a product may include a network of entities and activities that are involved in the creation of the product and its eventual sale to a customer. A blockchain based record of the supply chain for a product may be utilized, for example, to trace the provenance of parts and materials and to prevent counterfeit parts from entering the supply chain. Blockchain integration into the supply chain for a product may utilize IoT devices and data, oracles, and smart contracts. For example, an RFID tag may be attached to a product in order to physically track the product and record its location within the supply chain. Additionally, smart contracts may be utilized to record the various activities and interactions between entities that are involved in the product's supply chain. As discussed above with reference to FIGS. 6A and 6B, any data or information that may be digitally represented and electronically stored may be recorded in a blockchain by submitting the data as part of a blockchain transaction. When the transaction is included in a validated block that is added to the blockchain, the transaction and its associated data is recorded in the blockchain.

As an example, a permissioned blockchain may be utilized for recording and monitoring the entities and activities involved in food distribution, such as fruit or vegetables. The blockchain may be accessible to entities, such as the suppliers of seed and pesticides, farmers, distributors, grocery stores, customers, and regulators. The blockchain may record activities such as the sale of a pesticide and/or seed to the farmer, the harvesting and packaging of the fruit, its shipment to distributors' warehouses, its arrival at various stores, and eventual purchase by a consumer. Sensors and RFID devices may be utilized for tracking the fruit through the supply chain. For example, the fruit may be packaged in crates tagged with a unique RFID device. When the tagged crate is loaded onto a truck for shipment from the farm to a distributor, the crate may be scanned and a record of its shipment may be uploaded to the blockchain. When the crate arrives at a warehouse, it may be scanned again and a record of its arrival at the warehouse may be uploaded to the blockchain. Additionally, smart contracts may be executed throughout the supply chain. For example, when the crate is scanned at the warehouse, a smart contract between the farmer and the warehouse may be executed indicating that the crate was successfully shipped from the farmer to the warehouse and received by the warehouse.

As another example, a permissioned blockchain for an automobile may store a record of entities and activities related to a component that is utilized in the manufacturing of the automobile. The blockchain may be accessible to various entities, such as automobile OEMs, distributors and suppliers of materials and components, dealerships, mechanics, insurance providers, and others. While evaluating an accident involving a policy holder's automobile, an insurance provider 1410 may determine that the accident may have been caused by a defective component used in a wheel of the automobile. The insurance provider 1410 may wish to trace a provenance of the component based on information recorded in the permissioned blockchain. The insurance provider 1410 may query the blockchain data for information related to the component via, for example, a blockchain querying application executing on the first client device 1420. The query may include identifying information associated with the component. For example, the component may be marked with an identification that is unique to the component or a group of components. The results of the query may include records in the blockchain of the entities and activities that were involved in the creation of the component and its eventual sale to the automobile manufacturer.

Blockchain Enabled In-Store Purchasing

Figure 21:
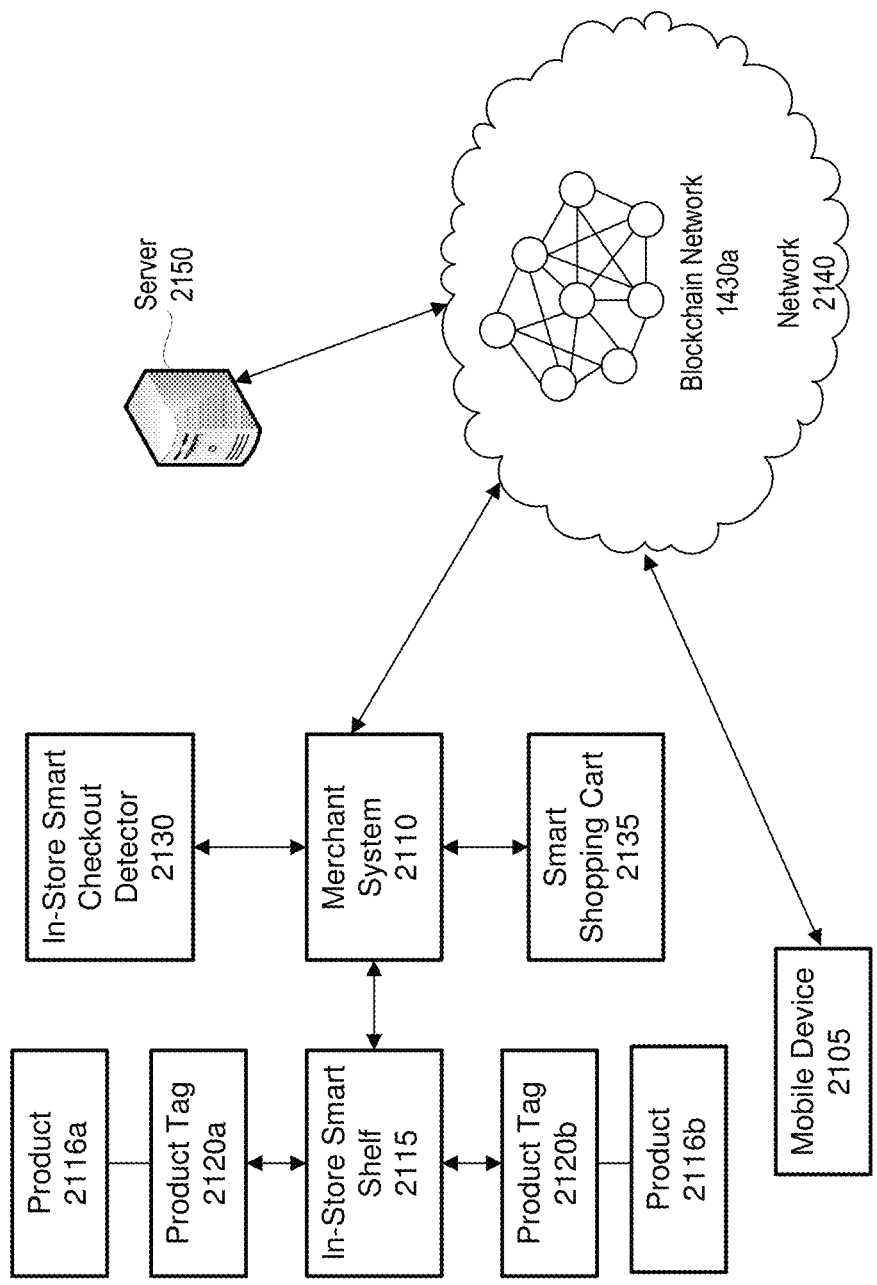
FIG. 21 illustrates an example of a blockchain enabled in-store purchase system.

An example of blockchain enabled in-store purchasing is described with reference to the system 2100 shown in FIG. 21, the process 1900 shown in FIG. 19A and the process 1901 shown in FIG. 19B. FIG. 21 illustrates an example of a blockchain enabled in-store purchase system 2100. The system 2100 includes a mobile device 2105, a merchant system 2110, and a server 2150 connected via a network 2140. The merchant system 2110 may be connected via a local wireless network to various IoT devices within a store, for example, an in-store smart shelf 2115, and an in-store smart checkout detector 2130.

The store may include one or more smart shelves, such as the in-store smart shelf 2115. The smart shelf 2115 may include an RFID tag, an RFID reader, and an antenna. One or more products may be stored on the in-store smart shelf 2115. Each product may include an RFID tag, such as a first product tag 2120*a* attached to a first product 2116*a* and a second product tag 2120*b* attached to a second product 2116*b*. The in-store smart shelf 2115 may, based on reading the product tags 2120*a* and 2120*b*, send information about the products 2116*a* and 2116*b* throughout the day to the merchant system 2110. The merchant system 2110 may in turn update an inventory of products currently within the store.

A shopper may travel through the store with the mobile device 2105. A digital shopping list on the mobile device 2105 may include a list of items that the shopper may need to purchase. For example, the shopping list may include an item that matches the first product 2116a. When the shopper is close to the in-store smart shelf 2115, the mobile device 2105 may notify the shopper that the first product 2116a is currently available on the in-store smart shelf 2115. The shopper may remove the first product 2116a from the in-store smart shelf 2115 and place it into a smart shopping cart 2135. The smart shopping cart 2135 may read the first product tag 2120a as well as the product tags attached to other products that may have been placed in the smart shopping cart 2135. When the shopper is ready to checkout, the shopper may walk out of the store with the shopping cart 2135. As the shopper walks out of the store, the in-store smart checkout detector 2130 may detect the smart shopping cart 2135. The smart shopping cart 2135 may communicate with the in-store smart checkout detector 2130 and transmit information about the products in the smart shopping cart. The in-store smart checkout detector 2130 may send information about the products, such as the first product 2116a, and payment information from the mobile device 2105 to the merchant system 2110. The merchant system 2110 may receive information from the in-store smart checkout detector 2130 and the payment information and proceed to initiate purchase of the first product 2116a.

Referring to step 1905 of the process 1900 shown in FIG. 19A, a wallet application on the mobile device 2105 may generate transaction data for transferring an amount of cryptocurrency matching the sale price of the first product 2116a from the shopper to the merchant. The wallet application may generate a public key for the transaction using the private key of the shopper. In order to indicate that the shopper is the originator of the transaction, a digital signature may also be generated for the transaction using the private key of the shopper. The transaction data may be sent to the server 2150 from the mobile device 2105.

The server 2150 may receive the transaction data from the mobile device 2105. At step 1910, the server 2150 may broadcast the transaction to the blockchain network 1430a. The transaction may be received by one or more nodes 1505 of the blockchain network 1430a. At step 1915, upon receiving the transaction, a node 1505 may choose to validate the transaction, for example, based on transaction fees associated with the transaction. If the transaction is not selected for validation by any of the nodes 1505, then the transaction may be placed in a queue and wait to be selected by a node 1505.

At step 1920, each of the nodes 1505 that selected the transaction may validate the transaction. At step 1925, if the transaction is successfully validated by a node 1505, the validated transaction is added to a block being constructed by that node 1505. At step 1935, the blockchain network 1430a may wait for a block to be published. At step 1940, if a block has not been published, then the process 1900 returns to step 1935 and waits for a block to be published. However, at step 1940, if a block has been published, then the process 1900 proceeds to step 1945.

At step 1945, the published block is broadcast to the blockchain network 1430a for validation. At step 1950, if the block is validated by a majority of the nodes 1505, then at step 1955, the validated block is added to the blockchain 1520. At step 1960, if the transaction was added to the blockchain 1520, the server 2150 may wait to receive a minimum number of blockchain confirmations for the transaction. At step 1965, if the minimum number of confirmations for the transaction have not been received, then the process may return to step 1960. However, if at step 1965, the minimum number of confirmations have been received, then the process proceeds to step 1970. At step 1970, the transaction may be executed and the sale price of the first product 2116a may be transferred from the shopper to the merchant.

When the in-store smart checkout detector 2130 sends information about the products, such as the first product 2116a, and payment information from the mobile device 2105 to the merchant system 2110, a smart contract may be created between the shopper and the merchant and executed according to the process 1901 shown in FIG. 19B. For example, at step 1976, a smart contract between the shopper and the merchant may be created and then submitted to the blockchain network 1430a as a transaction. For example, at step 1978, the process 1901 may wait to receive notification that an amount of cryptocurrency equal to the sale price of the first product 2116a was sent from a blockchain address associated with the shopper and was received at a blockchain address associated with the merchant by the time the first product 2116a is removed from the smart shopping cart 2135. If the payment for the first product 2116a was successfully transferred from the shopper to the merchant by the time the shopper removes the first product 2116a from the smart shopping cart 2135, then an electronic receipt may be generated and sent to the shopper. Otherwise, the merchant system 2115 may be alerted that the shopper is attempting to leave the premises without paying for the first product 2116a.

Blockchain Enabled In-Vehicle Purchasing

Figure 22:
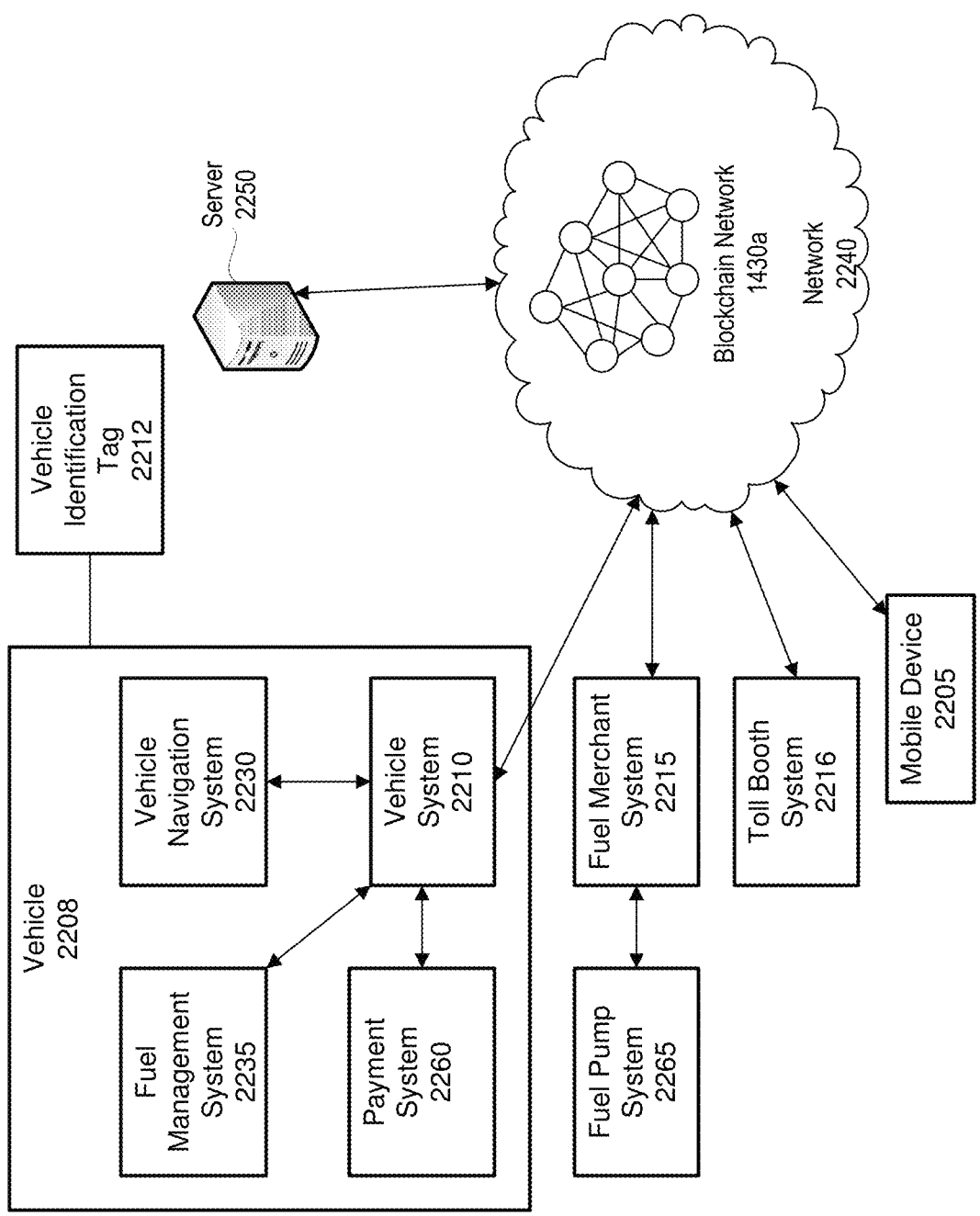
FIG. 22 illustrates an example of communications for an IoT blockchain enabled device system.

An example of blockchain enabled in-vehicle purchasing is described with reference to the system 2200 shown in FIG. 22, the process 1900 shown in FIG. 19A and the process 1901 shown in FIG. 19B. FIG. 22 illustrates an example system 2200 for blockchain enabled in-vehicle purchasing. The system 2200 includes an IoT enable smart vehicle 2208. The vehicle 2208 may include one or more computing devices implementing a vehicle system 2210, a vehicle navigation system 2230, a payment system 2260 and a fuel management system 2235. The vehicle 2208 may include a RFID tag, such as a vehicle identification tag 2212. The system 2200 may also include various merchant systems, such as a fuel merchant system 2215, and a toll booth system 2216. The system 2200 may also include a mobile device 2205 belonging to a driver of the vehicle 2208.

When the driver gets into the vehicle 2208, payment information may be loaded from the driver's mobile device 2205 into the vehicle payment system 2210 so it is available for secure payments to other devices in order to complete in-vehicle purchases, such as in-vehicle purchase of fuel and in-vehicle payment of tolls. The driver of the smart vehicle may pay for parking, fast food, using the IoT enabled smart vehicle 2208. Additionally, the IoT enabled smart vehicle 2208 may also facilitate in-vehicle purchasing of smartphone apps, music, audio books, and other goods and services.

The fuel management system 2235 may perform various functions related to fuel usage and communicate with the vehicle system 2210. For example, the fuel management system 2235 may monitor fuel usage and based on detecting that the fuel is below a threshold, notify the vehicle system 2210. The vehicle system 2210 may communicate with the vehicle navigation system 2230 to determine nearby fuel stations. The selection of a fuel station to may be based on various factors, such as the availability of fuel at nearby fuel stations, the vehicle's current route and location, incentives that may be offered by nearby fuel stations, etc. The vehicle system 2210 may notify the driver about the selection of a fuel station and the vehicle 2208 may be re-routed to the selected fuel station. Upon arriving at the selected fuel station, the driver may pull up to a fuel pump. The fuel pump may include a fuel pump system 2265 configured to detect the RFID tags of vehicles, such as the vehicle identification tag 2212 in order to obtain an identification of the vehicles. The fuel pump system 2265 and the payment system 2260 may be configured to communicate with each other. The fuel payment system 2260 may send payment information to the fuel pump system 2265. After the driver has completed re-fueling, the driver may simply drive away. The fuel pump system 2265 may send the fuel merchant system 2215 information about the identification of the vehicle 2208, the amount of fuel purchased, and the payment information. The fuel merchant system 2215 may use the information to complete a transaction with the driver for the purchase of the fuel. For example, the fuel merchant system 2215 may communicate with the server 2250 to charge the driver for the fuel according to the process 1900 shown in FIG. 19A. Additionally, the fuel merchant system 2215 may communicate with the server 2250 in order to create a smart contract between the driver and the fuel merchant. The smart contract may be created and executed according to the process 1901 shown in FIG. 19B.

Augmented Reality (AR), Mixed Reality and Blockchain Based E-Commerce

AR or mixed reality enabled devices, such as wearable smart glasses, head mounted devices, holographic devices, or smartphone applications overlay digital content on top of a real world view, thus, enhancing a user's experience of the real world. The overlay content may be 3D models generated based on 3D scanning real world objects. AR enables users to experience online shopping in a virtual environment. For example, using AR, browse virtual stores and view 3D models of items for sale in virtual stores. Just as in the real world, customers may be able to handle and examine various physical details of the products. Blockchain smart contracts may be utilized to provide an e-commerce platform where customers may purchase items from online merchants with cryptocurrency and digital wallets. Information about a product, such as country of origin, materials, ingredients, price, description, measurements, terms and conditions, 3D model of the physical product, etc., may be hashed and recorded in a blockchain. This provides proof of ownership of virtual goods and products and enables accurate tracking of any changes made to this information. Artificial intelligence (AI) may be utilized for generating 3D models of products based on 2D images of the products. Smart contracts may be utilized to conduct transactions between merchants and customers.

As an example, a customer may shop for clothing by browsing different stores in a virtual shopping mall via a wearable AR device, such as a pair of smart glasses. The customer may examine a 3D model of a shirt as he or she would in the real world. Additionally, the customer may virtually try on the shirt using a 3D model of the customer's body. If the customer decides to purchase the shirt, the customer may initiate a transaction with the merchant of the store. A transaction may be submitted to the blockchain via the customer's digital wallet to transfer money (cryptocurrency) from the customer to the merchant. Various smart contracts may be utilized to implement various aspects of the e-commerce process. For example, based on detecting that the sale price of the shirt has been successfully transferred from the customer to the merchant, a smart contract may be executed to initiate shipment of the shirt from the merchant's warehouse to the customer. As described above with reference to supply chain monitoring and tracking, RFID tags and other IoT devices may be utilized to track the shipment of the shirt from the merchant's warehouse to the delivery of the shirt to the customer's residence.

Quantum Computing

One of the concerns of quantum computing is that it may increase the probability of breaking cryptographic algorithms and thus, weaken overall security for the blockchain. This may be addressed by requiring larger key sizes for blockchain asymmetric-key pairs of cryptographic algorithms. In some cases, if there is a concern that a block may be decrypted in the future, a dynamically changing cryptographic hash may be utilized. A different cryptographic hash may be dynamically selected for a particular block or the entire blockchain based on various factors, such as whether there is a concern that the block will be decrypted in the future, increasing a strength of the hash, utilizing a hash that is better suited for protecting privacy. In some cases, different cryptographic hashes may be selected for different blocks.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Blockchain Size

Depending on a frequency at which events are recorded in a blockchain, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 14000 transactions with a new block that effectively mimics the hash of the 14000 transactions may be useful for managing blockchain size.

Blockchain Immutability

In some cases, content in a blockchain may need to be deleted. For example, content may need to be deleted if there is a security breach or if the content is no longer relevant. A level of immutability of a blockchain may depend on a type of the blockchain. For example, changing content may be difficult in a public blockchain due to its possible impact on a large number of users. According to some techniques, data stored in a private blockchain, or a public blockchain controlled by a few entities may be changed by recording a flag (current block) where the change is being made, and adding the current block (referred to by the flag) to the blockchain. The added block may then indicate the change made to the previous block.

As another example, a blockchain may need to be changed to resolve a broken link. For example, the hash of a changed block may no longer match the hash stored in the block+1. In some cases, the blockchain may need to be changed in order to reverse the results of illegal transactions. In some cases, the blockchain may need to be changed to address software errors, erroneous transactions, or remove information that is confidential or required by law to be removed. If the blockchain is immutable, these errors and information may be permanently embedded in the blockchain. Additionally, the blockchain may need to be changed to comply with regulatory concerns, such as the European Union's incoming General Data Protection Regulation (GDPR), or California Consumer Privacy Act (CCPA), regarding consumer data privacy and ownership rights, US Fair Credit Reporting Act, and the SEC's "Regulation S¬P," which require that recorded user identifiable personal financial data be redactable.

Some techniques may allow modifications to the blockchain to address software errors, legal and regulatory requirements, etc., by allowing designated authorities to edit, rewrite or remove previous blocks of information without breaking the blockchain. Such techniques may enable blockchain editing by using a variation of a "chameleon" hash function, through the use of secure private keys. This editing may allow smart contracts that were flawed at issue to be updated so that the changes carry over to subsequent smart contracts in the blockchain. Using these techniques, blocks that have been changed may be using a "scar" or mark that cannot be removed, even by trusted parties.

According to some techniques, when a block is hashed, any confidential information, such as personally identifiable information, and IP addresses, is not included in the hash because it is not part of the data values that were hashed. But because there is no hash of the confidential information, it may be changed. According to some techniques, the confidential information may not be placed or recorded into the blockchain. Rather the information may reside in a file that is external to the blockchain. A hash of that file, however, may be recorded in the blockchain. For example, a user's confidential information may be deleted locally without affecting the blockchain.

As another example, assuming that all content included in a block in a blockchain cannot be changed after a block is added to the blockchain, a determination may be made before adding data to the blockchain of whether some or all of that data may need to be deleted at a later time. For example, confidential information (i.e., data to be deleted at a later time) may be stored as a file that is external to the block and the blockchain. For the purposes of creating the block, a link to the file containing the confidential information and a hash of the file containing the confidential information file may be added to the block. An example of a link would be an HTTP link. During confirmation of the block that is to be added to the blockchain, the network nodes may be able to access the confidential information and verify that the confidential information based on the hash value of the file in the block. Because the hash value of the file is a part of the block, the file containing the confidential information may not be easily changed. However, it may be possible to change the confidential information file by changing the data therein and adding a nonce. This may seek to change the nonce until the resulting hash equals the hash that is stored in the blockchain. However, this would be difficult (probably near impossible), and an inspection of the modified confidential information file would reveal the added nonce, which may then raise suspicion that information was changed since it was first added to the blockchain.

Files containing confidential information may be encrypted (e.g., through an asymmetric key encryption function) prior to the hashing operation. When "deleting" the confidential information, the file containing the confidential information may be deleted or removed resulting in the link, which is stored in the blockchain, being ineffective for retrieving the file. The hash of the file, and the link, remain in the blockchain so that the linking of the blocks through hash functions is not affected. However, because of this change, a transaction that is part of the block or part of a different special block could be added to the blockchain to indicate that the link is no longer effective and the confidential information file is no longer part of the blockchain. This may effectively keep confidential information out of the blockchain while providing the confidential information to users of the blockchain and proof of authenticity of the confidential information before it is deleted from the blockchain. This may come with drawbacks because access to data implies that such data may be stored. Accordingly, those with access to the confidential information file, while it was part of the blockchain, may have stored that information in another location that may no longer be reachable during the "deleting" operation discussed above.

51% Attack

A "51% attack" refers to an individual mining node or a group of mining nodes controlling more than 50% of a blockchain network's mining power, also known as hash rate or hash power. The hash rate is a measure of the rate at which hashes are being computed on the blockchain network. As described above, hashing may include taking an input string of a given length, and running it through a cryptographic hash function in order to produce an output of a fixed length. A blockchain network's hash rate may be expressed in terms of 1 KH/s (kilohash per second) which is 1,000 hashes per second, 1 MH/s (megahash per second) which is 1,000,000 hashes per second, 1 TH/s (terahash per second) which is 1,000,000,000,000 hashes per second, or 1 PH/s (petahash per second) which is 1,000,000,000,000,000 hashes per second. As an example, a mining node in a blockchain utilizing a proof of work consensus model (PoW) may perform hashing in order to find a solution to a difficult mathematical problem. The hash rate of the mining node may depend on the computational resources available to that node. A mining node that successfully solves the mathematical problem may be able to add a block to the blockchain. Thus, by ensuring that invalid transactions cannot be included in a block, mining nodes increase the reliability of the network. Transactions may be deemed invalid if they attempt to spend more money than is currently owned or engage in double-spending. If a mining node intentionally or unintentionally includes an invalid transaction in a block, then the block will not be validated by the network. Additionally, nodes that accept the invalid block as valid and proceed to add blocks on top of the invalid block will also end up wasting computational resources. Thus, mining nodes are discouraged from cheating by intentionally adding invalid transactions to blocks and accepting invalid blocks as valid.

An entity may be able to disrupt the network by gaining control of 50% of a network's hash rate. In a 51% attack, a blockchain node may intentionally reverse or overwrite transactions and engage in double-spending. When a node generates a valid block of transactions, it broadcasts the block to the network for validation. In some cases, a node controlling more than 50% of a network's hash rate may mine blocks in private without broadcasting them to the network. In such a scenario, the rest of the network may follow a public version of the blockchain while the controlling node may be following its private version of the blockchain. FIG. 20A shows a fraudulent and valid version of a blockchain. The valid blockchain on the top comprises the valid blocks 2005, 2010*a*, 2015*a*, and 2020. The fraudulent blockchain on the bottom is not broadcast to the network and includes the blocks 2005, 2010*b*, 2015*b*, and an invalid block 2020.

FIG. 20B shows another fraudulent and valid version of a blockchain. The valid version of the blockchain includes nodes 2040, 2045*a*, 2050*a*, and 2055*a*. The fraudulent version of the blockchain includes nodes 2040, 2045*b*, 2050*b*, 2055*b*, and 2075. However, following the longest chain rule, the network may select and utilize the private or fraudulent blockchain comprising nodes 2040, 2045*b*, 2050*b*, 2055*b* and 2075. Since it is the longest chain, previous transactions may be updated according to this chain. The cheating node may include transactions that spend money, such as the block 2050*b* including the transaction for 1450 BTC, on the public or fraudulent version of the blockchain without including these transactions in the private version of the blockchain. Thus, in the private version of the blockchain, the cheating node may continue to own the spent 1450 BTC. When the cheating node controls more than 50% of the hashing resources of the network, it may able to broadcast its private version of the blockchain and continue to create blocks on the private blockchain faster than the rest of the network, thus, resulting in a longer blockchain. Since there are two versions of the blockchain, the network may select the longest or fraudulent private blockchain as the valid blockchain. As a result, the rest of the network may be forced to use the longer blockchain. The public or valid version of the blockchain may then be discarded or abandoned and all transactions in this blockchain that are not also in the private or fraudulent version of the blockchain may be reversed. The controlling or cheating node may continue to own the spent money because the spending transactions are not included on the fraudulent version of the blockchain, and the cheating node may therefore, spend that money in future transactions.

Because of the financial resources needed to obtain more hashing power than the rest of the entire network combined, a successful 51% attack may generally be challenging to achieve. However, it would be less expensive to achieve a 51% attack on a network with a lower hash rate than one with a higher has rate. Additionally, the probability of a successful 51% attack increases with the use of mining pools in which multiple nodes may combine their computational resources, for example, when mining is performed from the same mempool.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor; and
   a non-transitory computer-readable medium having stored thereon computer-executable instructions that are executable by the system to cause the system to perform operations comprising:
   accessing a blockchain;
   building a transaction graph based on the blockchain by iteratively:
   selecting a transaction recorded in the blockchain,
   adding a respective node for one or more transactors, whereby the nodes of the transaction graph respectively represent blockchain addresses that are recorded in the blockchain, and
   adding an edge between the nodes representing the transactors in the transaction, whereby the edges of the transaction graph respectively represent blockchain transactions between different ones of the blockchain addresses that are recorded in the blockchain; and
   calculating risk scores respectively corresponding to the blockchain addresses, based on analyzing the transaction graph via at least one machine learning algorithm.

2. The system of claim 1, wherein the analyzing the transaction graph via the at least one machine learning algorithm comprises:
   executing a community detection algorithm on the transaction graph, wherein the community detection algorithm is configured to identify a set of transaction communities within the transaction graph.

3. The system of claim 2, wherein the set of transaction communities are transactionally isolated from each other.

4. The system of claim 2, wherein the analyzing the transaction graph via the at least one machine learning algorithm further comprises:
   executing an importance-assignment algorithm on a first transaction community in the set of transaction communities, wherein the importance-assignment algorithm is configured to respectively assign levels of importance to nodes that are within the first transaction community.

5. The system of claim 4, wherein the importance-assignment algorithm assigns a first level of importance to a first node that is within the first transaction community, and wherein the calculating the risk scores comprises:
   calculating a first risk score corresponding to the first node, based on the first level of importance, based on a number of edges coupled to the first node, and based on a size of the first transaction community.

6. The system of claim 5, wherein the first level of importance, the number of edges coupled to the first node, and the size of the first transaction community are respectively weighted by configurable parameters.

7. The system of claim 1, wherein the operations further comprise:
   transmitting, to a computing device associated with the blockchain, a risk report identifying the risk scores respectively corresponding to the blockchain addresses.

8. A computer-implemented method, comprising:
   accessing, by a computer system, a blockchain, wherein the blockchain indicates a set of blockchain transactions that have occurred among a set of blockchain addresses;
   building, by the computer system, a transaction graph based on the blockchain, wherein nodes of the transaction graph correspond to the set of blockchain addresses, wherein edges of the transaction graph correspond to the set of blockchain transactions, and wherein edge weights of the transaction graph indicate cryptocurrency amounts involved in the set of blockchain transactions; and
   calculating, by the computer system, risk scores associated with the set of blockchain addresses, based on executing at least one machine learning algorithm on the transaction graph;
   receiving a request for a blockchain transaction involving one of the blockchain addresses; and
   processing the requested blockchain transaction according to the calculated risk score for the one of the blockchain addresses.

9. The computer-implemented method of claim 8, wherein edge directions of the transaction graph indicate from which blockchain addresses and to which blockchain addresses cryptocurrency was transferred in the set of blockchain transactions.

10. The computer-implemented method of claim 8, wherein the executing the at least one machine learning algorithm on the transaction graph comprises:
executing, by the computer system, a community detection algorithm on the transaction graph, wherein the community detection algorithm is configured to segment the transaction graph into a set of non-overlapping transaction communities; and
executing, by the computer system, an importance-assignment algorithm on a first transaction community in the set of non-overlapping transaction communities, wherein the importance-assignment algorithm is configured to respectively assign levels of importance to nodes that are within the first transaction community, based on weights and directions of edges within the first transaction community.

11. The computer-implemented method of claim 10, wherein the importance-assignment algorithm assigns a first level of importance to a first node that is within the first transaction community, and wherein the calculating the risk scores comprises:
calculating, by the computer system, a first risk score corresponding to the first node, based on the first level of importance.

12. The computer-implemented method of claim 11, wherein the first risk score is further based on a number of edges pointing away from the first node or based on a number of edges pointing toward the first node.

13. The computer-implemented method of claim 11, wherein the first risk score is further based on a bit that indicates whether the first node is a most important node in the first transaction community.

14. The computer-implemented method of claim 11, wherein the first risk score is further based on an amount of time since creation of a blockchain address that corresponds to the first node.

15. A computer program product for facilitating blockchain address risk assessment via graph analysis, the computer program product comprising a computer-readable medium having program instructions embodied therewith, the program instructions executable by a computer system to cause the computer system to perform operations comprising:
building a transaction graph to represent a blockchain, wherein nodes of the transaction graph represent blockchain addresses recorded in the blockchain, and wherein directed and weighted edges of the transaction graph represent blockchain transactions between different ones of the blockchain addresses recorded in the blockchain; and
calculating risk scores of the blockchain addresses, based on analyzing the transaction graph via at least one machine learning algorithm;
receiving a request for a blockchain transaction involving one of the blockchain addresses; and
processing the requested blockchain transaction according to the calculated risk score for the one of the blockchain addresses.

16. The computer program product of claim 15, wherein the analyzing the transaction graph via the at least one machine learning algorithm comprises:
executing a community detection algorithm on the transaction graph, wherein the community detection algorithm is configured to identify a set of isolated transaction communities within the transaction graph; and
executing an importance-assignment algorithm on a first transaction community in the set of isolated transaction communities, wherein the importance-assignment algorithm is configured to respectively assign levels of importance to blockchain addresses that are within the first transaction community.

17. The computer program product of claim 16, wherein the importance-assignment algorithm assigns a first level of importance to a first blockchain address that is within the first transaction community, and wherein the calculating the risk scores comprises:
calculating a first risk score corresponding to the first blockchain address, based on the first level of importance and based on at least one other variable.

18. The computer program product of claim 17, wherein the at least one other variable includes a number of blockchain transactions in which the first blockchain address transferred cryptocurrency, a number of blockchain transactions in which the first blockchain address received cryptocurrency, a size of the first transaction community, an amount of time since creation of the first blockchain address, or a bit indicating whether the first blockchain address is a most important blockchain address in the first transaction community.

19. The computer program product of claim 17, wherein the first risk score is based on a weighted linear combination of the first level of importance and the at least one other variable.

20. The computer program product of claim 19, wherein the first risk score is based on a reciprocal exponential of the weighted linear combination.

\* \* \* \* \*